US009207316B2

(12) United States Patent
Stolarczyk et al.

(10) Patent No.: US 9,207,316 B2
(45) Date of Patent: Dec. 8, 2015

(54) RADAR FOR REJECTING AND LOOKING PAST SURFACE REFLECTIONS

(71) Applicant: Stolar, Inc, Raton, NM (US)

(72) Inventors: Larry G. Stolarczyk, Rio Rancho, NM (US); Richard B. Main, Newark, CA (US)

(73) Assignee: Stolar, Inc., Raton, NM (US)

( * ) Notice: Subject to any disclaimer, the term of this patent is extended or adjusted under 35 U.S.C. 154(b) by 160 days.

(21) Appl. No.: 14/152,823

(22) Filed: Jan. 10, 2014

(65) Prior Publication Data

US 2014/0125509 A1    May 8, 2014

Related U.S. Application Data

(63) Continuation-in-part of application No. 13/862,379, filed on Apr. 13, 2013, now Pat. No. 9,024,802, and a continuation-in-part of application No. 13/301,762, filed on Nov. 21, 2011, now Pat. No. 8,847,813, and a (Continued)

(51) Int. Cl.
*G01V 3/17* (2006.01)
*G01S 13/88* (2006.01)
(Continued)

(52) U.S. Cl.
CPC .......... *G01S 13/885* (2013.01); *G01S 7/35* (2013.01); *G01S 13/32* (2013.01); *G01V 3/12* (2013.01); *H01Q 1/3216* (2013.01); *H01Q 1/521* (2013.01); *H01Q 21/062* (2013.01); *G01V 3/17* (2013.01)

(58) Field of Classification Search
CPC ......... G01S 13/885; G01S 7/35; G01S 13/32; H01Q 1/521; H01Q 1/3216; H01Q 21/062; G01V 3/12; G01V 3/17

USPC .............................................. 342/22, 27, 175
See application file for complete search history.

(56) References Cited

U.S. PATENT DOCUMENTS 5,900,833 A *   5/1999  Sunlin et al. .................... 342/22
2002/0011947 A1*  1/2002  Stolarczyk et al. ............ 342/22

(Continued)

OTHER PUBLICATIONS

Sungil Kim; Han-Chul Ryu; Seong-Bum Kang; Minhwan Kwak; Se-Young Jeong; Dae-Won Kang; Sang Kug Choi; Mun-Chul Baek; Kwang-Young Kang, "A CW sub-THz generator based on a double sideband-suppressed carrier without additional filters," Microwave Conference, 2009. EuMC 2009. European , vol., No., pp. 838,841, Sep. 29, 2009-Oct. 1, 2009.*

*Primary Examiner* — John B Sotomayor
(74) *Attorney, Agent, or Firm* — Main Cafe; Richard B. Main

(57) ABSTRACT

A multi-modal ground penetrating radar includes a radar set configured to launch predistorted double-sideband (DSB) suppressed-carrier modulated continuous waves (CW) to illuminate and penetrate a ground surface. A variable frequency modulator is connected to modulate a continuous wave (CW) carrier frequency generator within the radar set to yield a double-sideband suppressed carrier output. A lateral single-file array of antennas is configured to be flown closely over the surface of the ground. A multiplexing switch is connected to the array of antennas and configured to selectively switch individual ones of the antennas to the radar set. Any early arriving signals returned from geologic clutter and surface reflections are suppressed in synchronous detection in relation to signals received by the array of antennas from less shallow depths. Interesting objects below the ground surface are detected and located by the late arriving signal reflections.

12 Claims, 13 Drawing Sheets

Related U.S. Application Data continuation-in-part of application No. 14/150,736, filed on Jan. 8, 2014.

(60) Provisional application No. 61/750,318, filed on Jan. 8, 2013.

(51) Int. Cl.
*G01S 7/35* (2006.01)
*G01S 13/32* (2006.01)
*G01V 3/12* (2006.01)
*H01Q 1/32* (2006.01)
*H01Q 1/52* (2006.01)
*H01Q 21/06* (2006.01)

(56) References Cited

U.S. PATENT DOCUMENTS

2014/0125508 A1* 5/2014 Stolarczyk et al. ............ 342/22
2014/0125509 A1* 5/2014 Stolarczyk et al. ............ 342/22

* cited by examiner

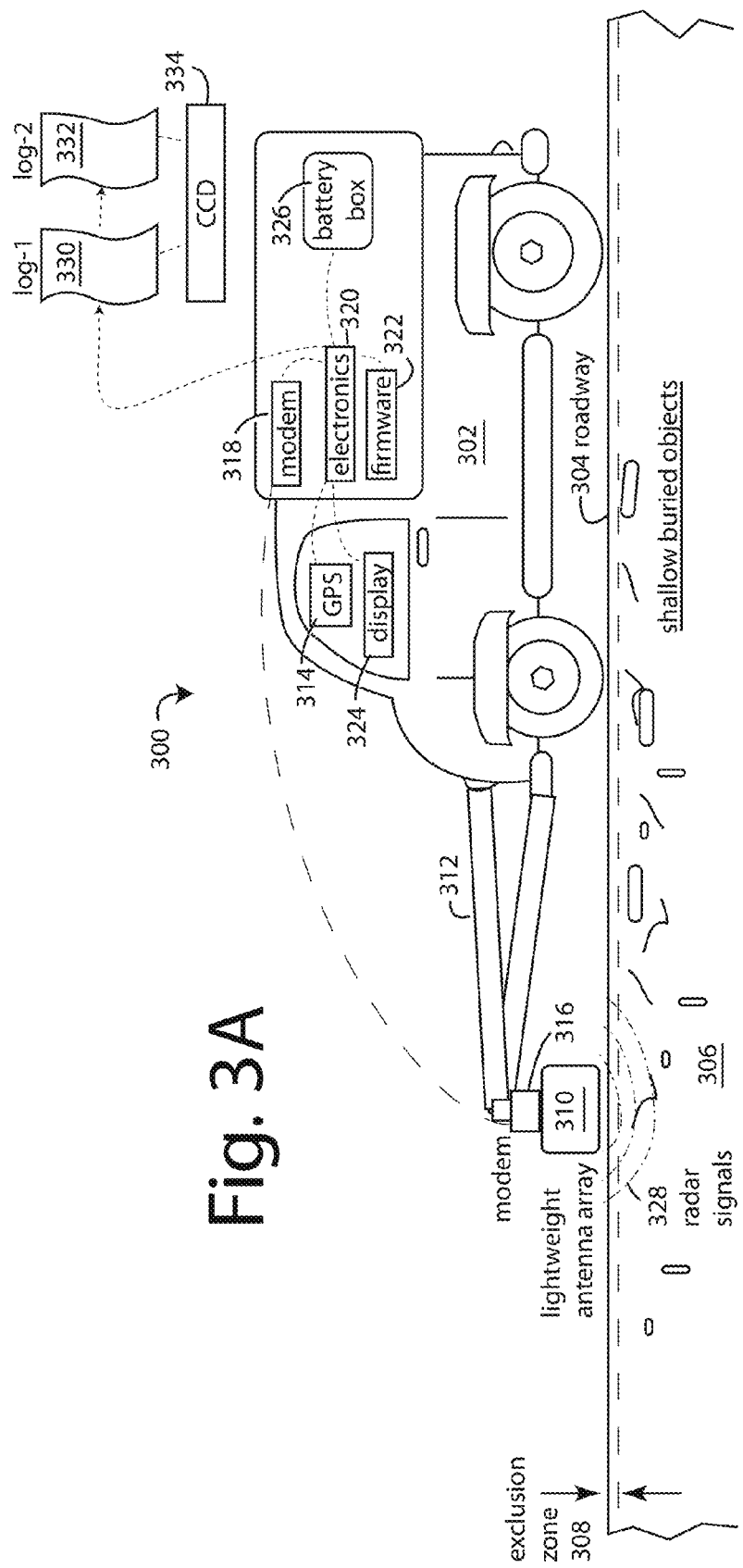

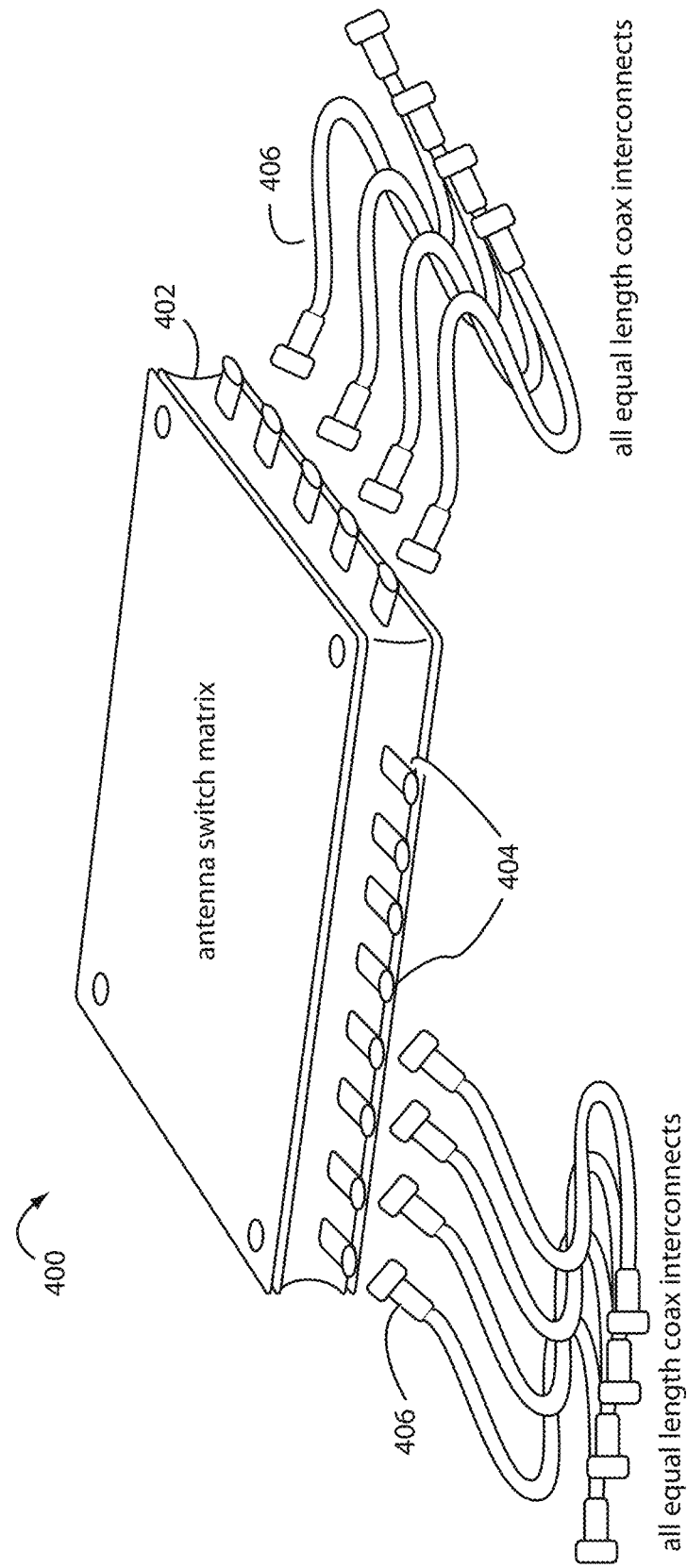

RADAR FOR REJECTING AND LOOKING PAST SURFACE REFLECTIONS

RELATED APPLICATIONS

This application is a continuation-in-part of U.S. patent application Ser. No. 14/150,736 filed Jan. 8, 2014, and titled LARGE AREA GROUND MONITORING, which in turn claims benefit of U.S. Provisional Patent Application 61/750,318 filed Jan. 8, 2013, and titled PREDISTORTED DOUBLE SIDEBAND GROUND PENETRATING GRADIOMETRIC RADAR WITH SUPPRESSION OF CLUTTERING REFLECTIONS, by Larry G. Stolarczyk; and it also claims benefit of and is a continuation-in-part of U.S. patent application Ser. No. 13/862,379, filed Apr. 13, 2013, and titled, ELECTROMAGNETIC DETECTION AND IMAGING TRANSCEIVER (EDIT) AND ROADWAY TRAFFIC DETECTION SYSTEM, by Larry G. Stolarczyk; and also a continuation-in-part of U.S. patent application Ser. No. 13/301,762, filed Nov. 21, 2011, and titled, UNSYNCHRONIZED RADIO IMAGING, by Igor Bausov, Gerald Stolarczyk, and Larry G. Stolarczyk.

BACKGROUND

1. Field of the Invention

The present invention relates to the electronic sensing of shallow buried objects in the ground surface over large areas, and more particularly to sensors and systems able to look past the strong signal reflections bouncing back from the surface.

2. Description of the Problems to be Solved

Various kinds of conventional, mobile, portable equipment and methods are in use worldwide to scan the top layers and surfaces of the ground to detect and locate valuable, and sometimes dangerous objects. Meteorite hunters routinely use tuned coils sensitive to magnetic materials to sweep for melted and burnt bits of iron and steel that fall to the ground from meteors. Other kinds of metal detectors and ground scanners are used by treasure hunters to find hordes of gold, silver, copper and other precious metals and artifacts.

Radar based detectors and active sonars universally send either continuous wave (CW) or pulsed transmissions into the ground so that echoes returned from buried objects can be received and interpreted. A few synthetic aperture radars use multi-element linear antenna arrays to improve resolution.

A problem common to all conventional radars and active sonars is the so-called "first-interface" between the atmosphere and the top surface of the ground that returns a very strong reflection. Such first-interface reflections can be so strong as to completely overwhelm and push aside the much fainter signals being reflected and returned by small, shallow objects, and especially from targets very deeply buried. Often the reflective things at the surface are of no interest, and they can change their character with wind, rain, road travel, and benign human activity, making for too many false positives.

Construction crews seem to be routinely ripping accidently into buried wires, pipes, and vaults in spite of many official programs and laws for them not to dig without checking first. Sometimes these failures are harmless and little damage is done, but other times serious and catastrophic breaches can occur that take lives, inflict injuries, and costs millions of dollars.

Not every bit of our infrastructures are fully mapped and known, the smaller, older industrial bits have often escaped being inventoried, cataloged and registered. The problems are especially pronounced in third world countries and war torn areas subject to quick fixes and unauthorized construction.

Pipes, wires, canisters, tubs, and other manufactured items are made of a variety of materials that will electromagnetically or dielectrically contrast with surrounding soils if buried in the earth. The things we are concerned with here are not so deeply buried, it is practical to scan them with detectors, even on-the-fly.

In some applications, what's of interest is target objects that were not present before and have recently appeared. In other applications what has recently appeared is of no interest and can be ignored. In still other applications, only manmade objects are of interest.

The trouble is many naturally occurring things can appear to a radar or sonar scan to be manmade objects. For example, a heavy overnight dew can produce puddles of conductive water that will contrast with a more dielectric soil. The shapes these can take often mimic particular objects of interest.

The present inventors discovered that resonant microwave patch antennas (RMPA) driven by continuous wave signals kept at resonance can be used as a very sensitive sensor. Changes in the dielectric character of the immediate environment will affect the loading on the RMPA and therefore manifest as changes in its complex input impedance at resonance. Movements and stationary anomalies deep in the ground can be sensed and characterized.

Various kinds of conventional, mobile, portable equipment and methods are in use worldwide to scan the top layers and surfaces of the ground to detect and locate valuable, and sometimes dangerous objects. Meteorite hunters routinely use tuned coils sensitive to magnetic materials to sweep for melted and burnt bits of iron and steel that fall to the ground from meteors. Other kinds of metal detectors and ground scanners are used by treasure hunters to find hordes of gold, silver, copper and other precious metals and artifacts.

Radar based detectors universally send either continuous wave (CW) or pulsed radio transmissions into the ground so that echoes returned from buried objects can be received and interpreted. As we have described in several of our earlier United States patents, the so-called "first-interface" between the atmosphere and the top surface of the ground will return a very strong reflection. Such first-interface reflections can completely swamp and obscure the much fainter signals being reflected by small, shallow objects, and/or ones very deeply buried.

Manufactured objects buried in the ground can be constructed as all-plastic, low-metal, and all-metal. The smaller they are overall, of course, the more difficult they will be to detect because they return fainter signals. All-plastic and low-metal objects can avoid or frustrate detection by conventional methods that depend on the presence of iron and concomitant electromagnetic response.

Sensors deployed to find these more common objects therefore need to operate in many kinds of modes. The dielectric contrasts of these devices with the surrounding soils can be used to advantage to highlight the object for analysis of signature characteristics.

One-pass and two-pass methods have been conventionally used to find wires, pipes, and other objects-of-interest. One-pass methods must be used when there has been no previous opportunity to make and record a prior sweep or survey.

Two-pass methods provide more useful results, but only if the second pass matches the course of the first pass. A preliminary sweep of the ground must be collected to determine one or more baseline conditions. Rugged high capacity storage media is getting very inexpensive, making large surveys very practical and affordable. New data from subsequent sweeps can then be advantageously compared to data from the priors sweeps to highlight any changes.

Getting the data between passes to be coherent and register properly is not so easy. Practical, real world coherent change detection (CCD) processing of GPR signals obtained from multiple passes and scans is described in more detail in United States Patent Application US 2013-0050008, published by Robert Atkins, et al., Feb. 28, 2013.

Many changes can be quite benign or of no interest whatsoever, e.g., puddles from a recent rain, morning dew, roadside debris, construction, ruts, footprints, and other ordinary events. Very few changes that get noticed will actually signal something of interest has been detected. Often what is of interest are things that were deliberately placed in the interim, and such indications are too important to be missed or misinterpreted.

There is a need for a device and system that can electronically detect and characterize shallow things near the ground surface without any false positives or negatives.

SUMMARY OF THE INVENTION

Briefly, all embodiments of the present invention employ "rejection zones" tuned to the surface depths which are subject to inconsequential dielectric variations. Valuable, critical, dangerous and harmful objects will be deeper, in the layers usually obscured by the strong radar reflections conventional radars suffer coming from the ground surface. The double sideband gradiometric (double-sideband gradiometer) methods employed here can achieve up to 70-dB of clutter rejection, thus improving false positive performance. The suppression is dependent only on frequency separation, e.g., modulation frequency is one-half of the separation between the two sidebands.

An alternative embodiment uses an automatic frequency control to keep a continuous wave (CW) transmission tuned to the changing resonant frequencies of resonant microwave patch antennas (RMPA) in the antenna array. Changes in the RMPA loading and the bulk dielectric constant of mixed media in front of the RMPA will affect its resonant frequency and more importantly its input impedance. Various shifts in the measured input impedance of a directional RMPA over short periods are interpretable as significant objects worth monitoring or just debris. The phase angles of the measured input impedances can indicate the objects' positions and character.

Other embodiments of the present invention build in so-called "rejection zones" which are tuned to the surface depths subject to such inconsequential dielectric variations. Valuable, critical, dangerous and harmful objects will be deeper, in the layers usually obscured by the strong radar reflections conventional radars suffer coming from the ground surface. The double sideband gradiometric (double-sideband gradiometer) methods employed here can achieve up to 70-dB of clutter rejection, thus improving false positive performance.

Another embodiment of the present invention uses a ground vehicle to move an antenna array in back-and-forth sweeps over large areas or distances. The antenna array comprises dozens of compartmentalized radio dipole antennas arranged laterally, shoulder-to-shoulder across the width of each sweep. These each are configured to be resonant microwave patch antennas (RMPA's). An antenna switch matrix is connected between the antenna array and a ground-penetrating-radar (GPR) set and provides electronic aperture switching and selection, and the ability to laterally register one sweep to the next. The antenna array is extended out in front of the ground vehicle on a pivotable boom, and the cantilevered weight is a primary concern. The antenna array is constructed with aluminum-on-aluminum honeycomb panels slotted and folded around dozens of resistive card compartment separators. Printed circuit boards with matching baluns are also slotted to receive tabs on the resistive cards, and their dipole elements are resistive loaded to quench crosstalk and near field effects. The several compartments in the antenna array are filled with rigid encapsulating foam.

These and other objects and advantages of the present invention will no doubt become obvious to those of ordinary skill in the art after having read the following detailed description of the preferred embodiments which are illustrated in the various drawing figures.

IN THE DRAWINGS

Figure 3B:
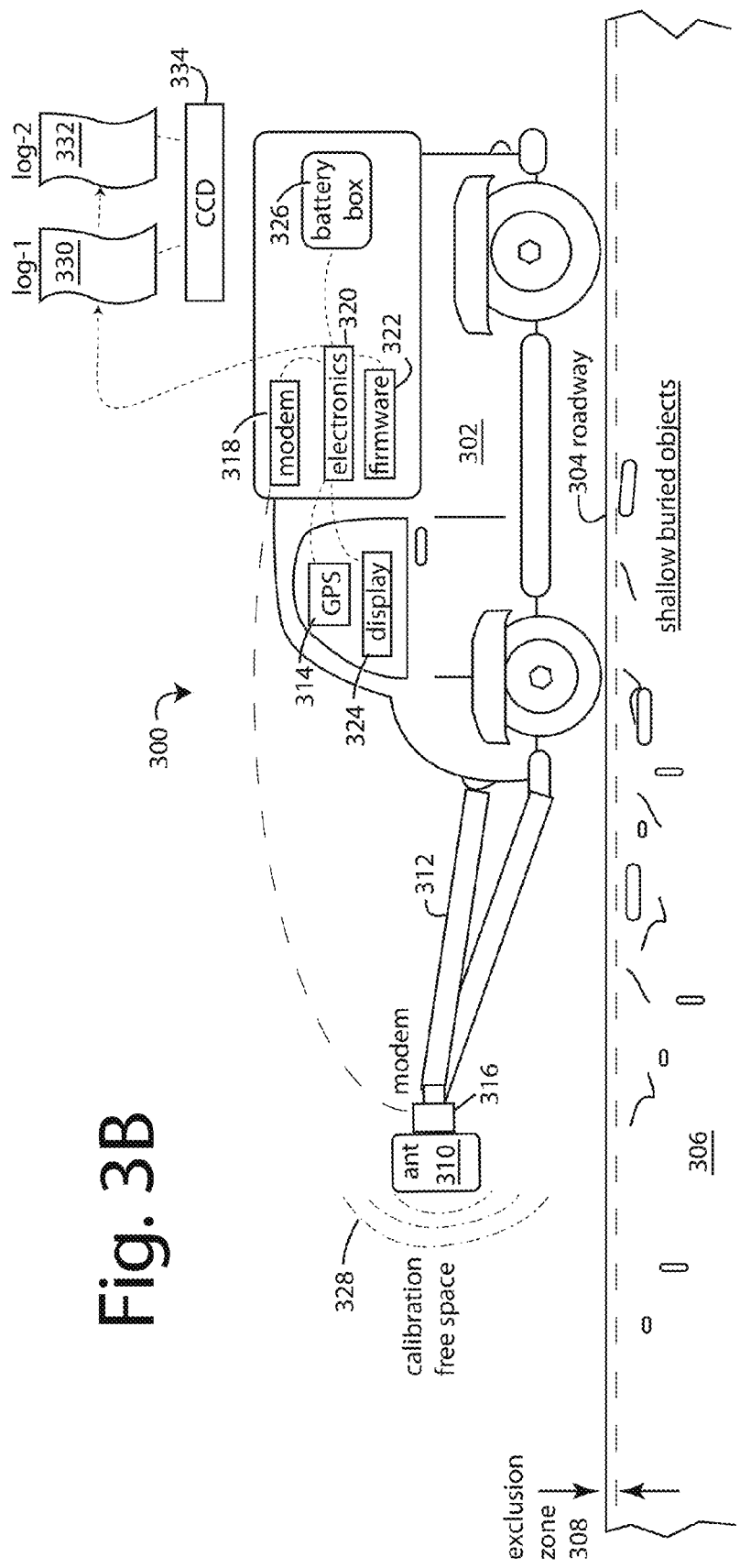
FIG. 3A is a side view diagram representing a ground imaging system that uses a ground vehicle to move an antenna array in back-and-forth sweeps over large areas or distances.
Figure 5:
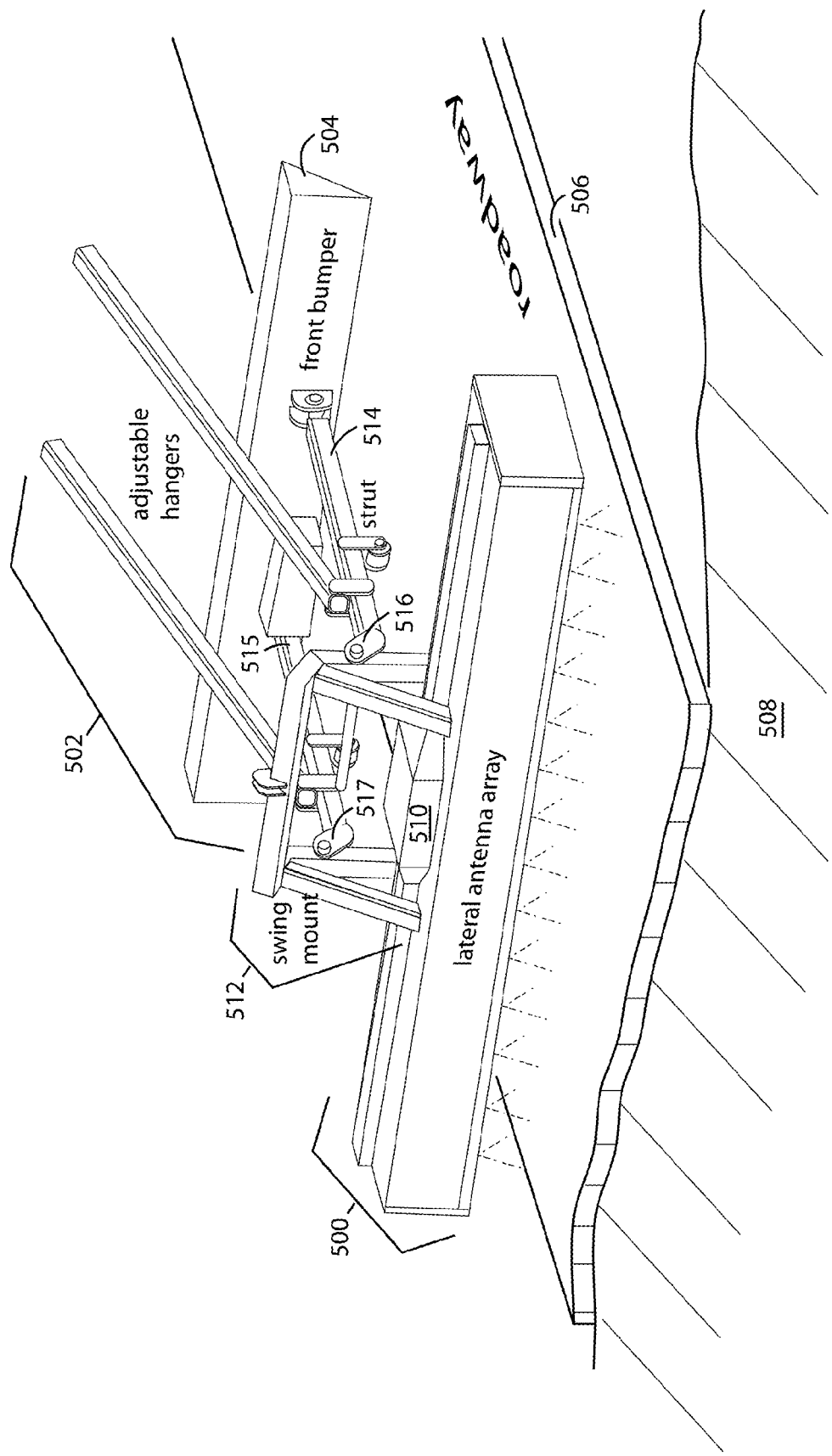
Figure 6:
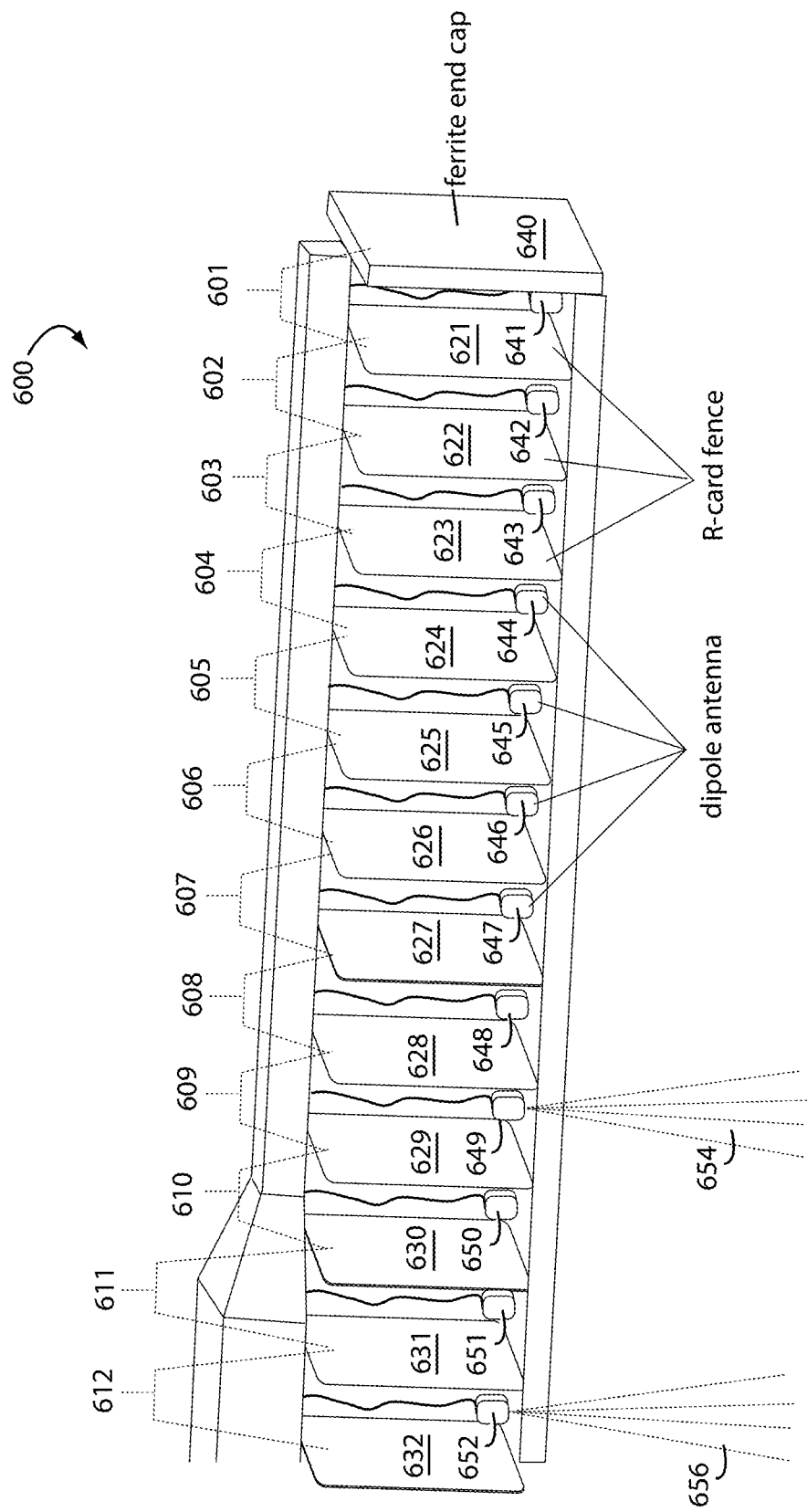
Figure 7:
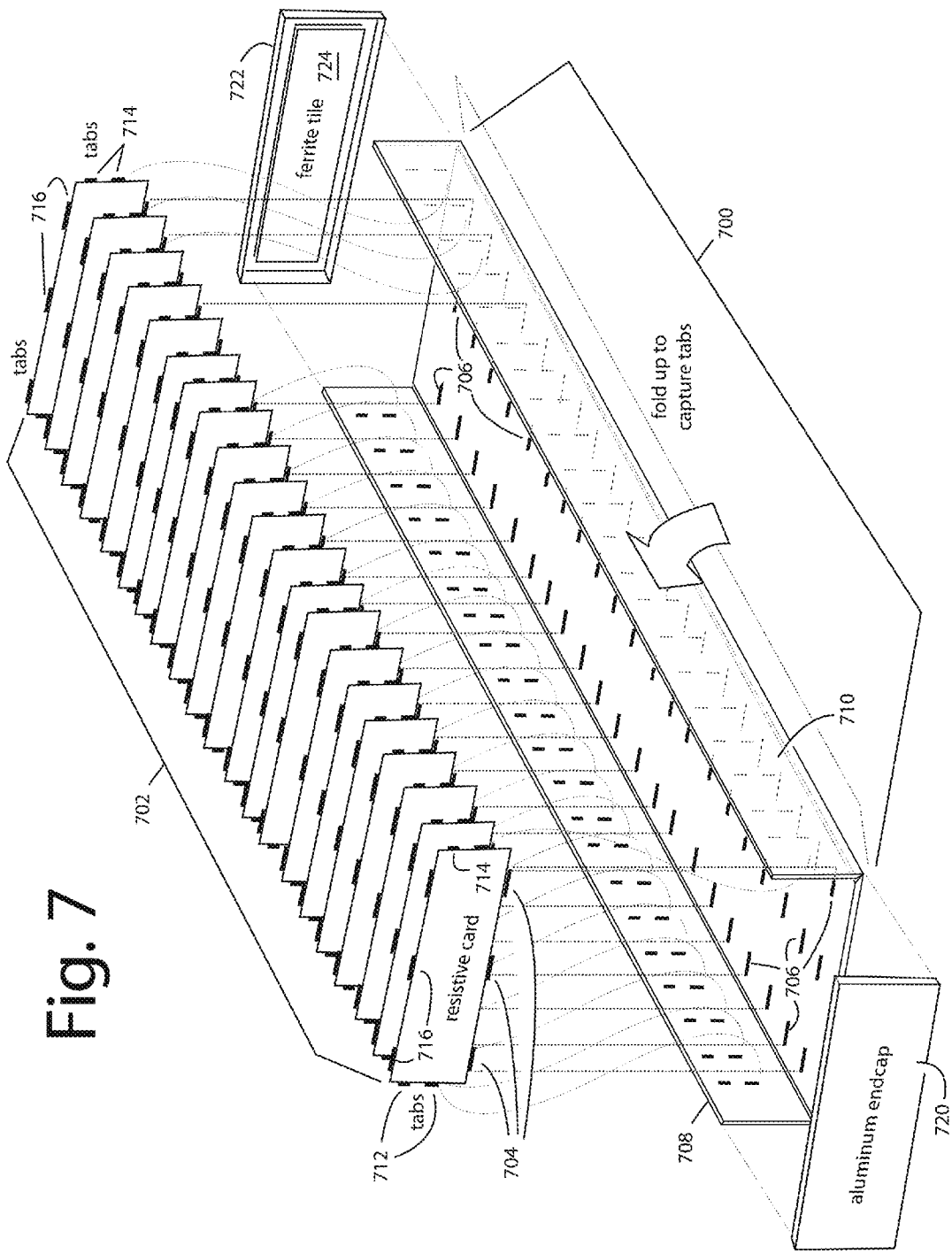
Figure 8:
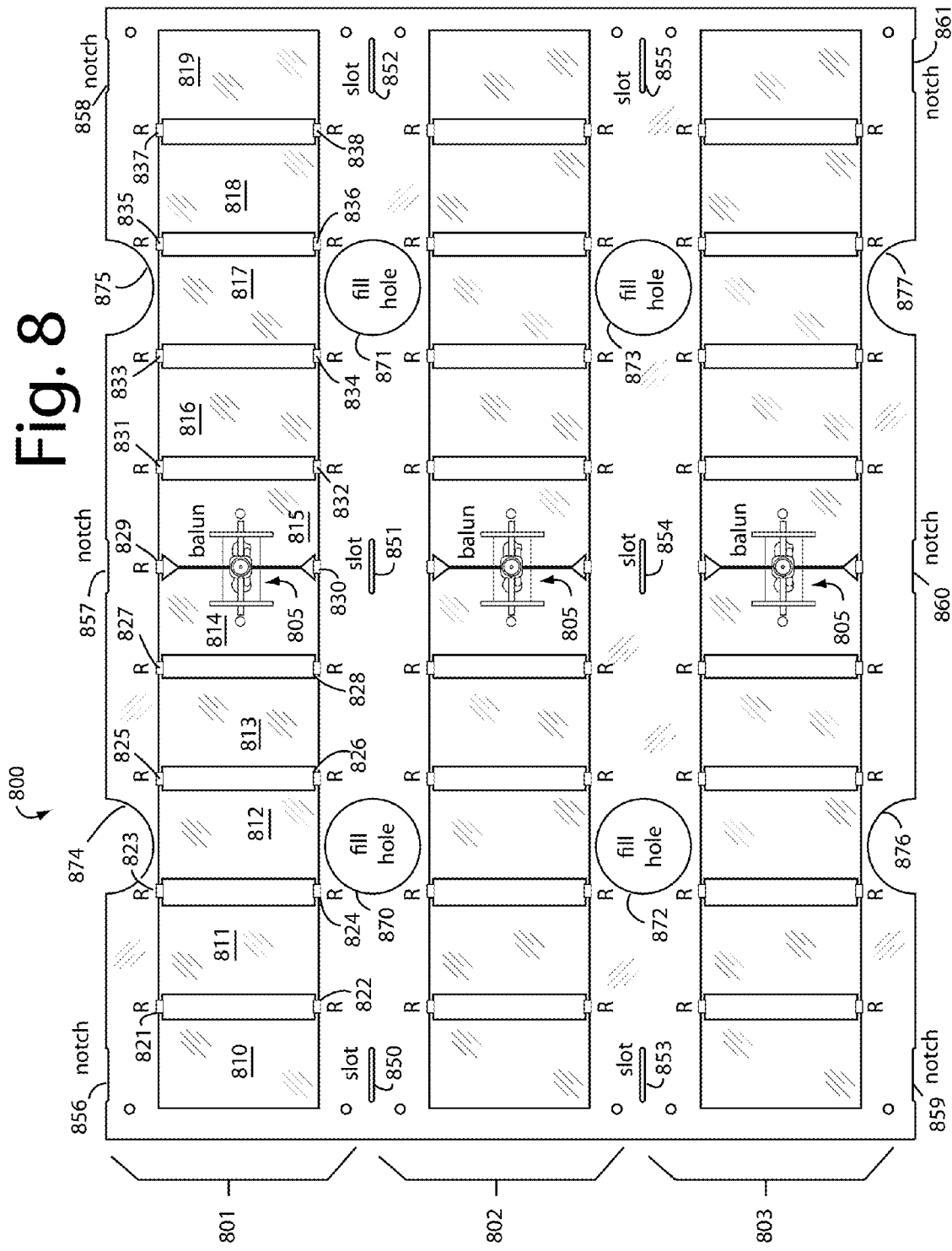
Figure 9:
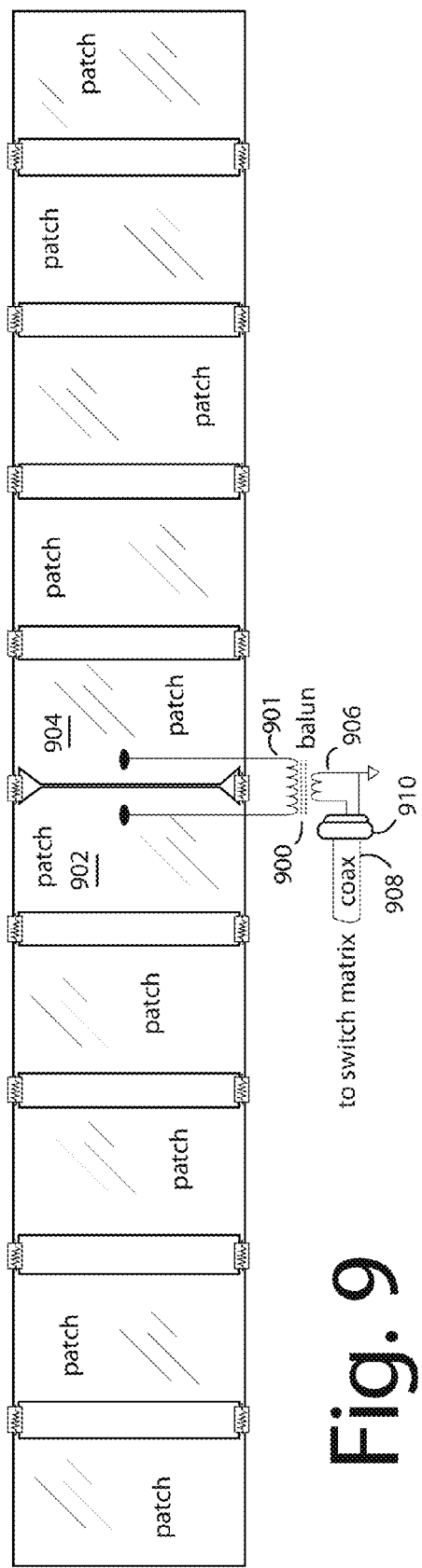
Figure 10:
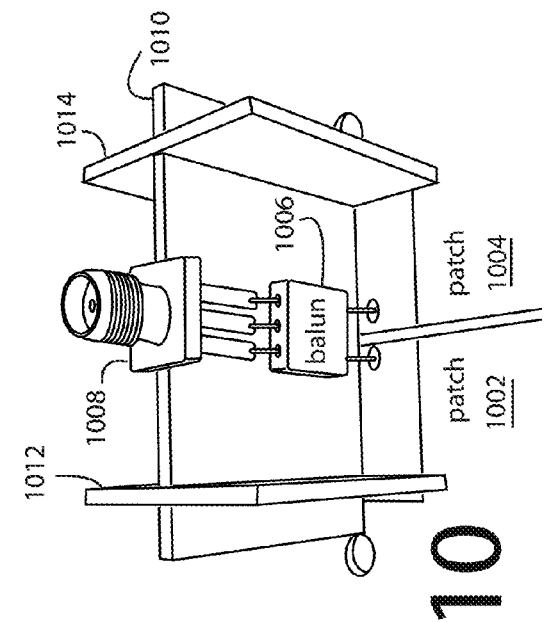
Figure 11:
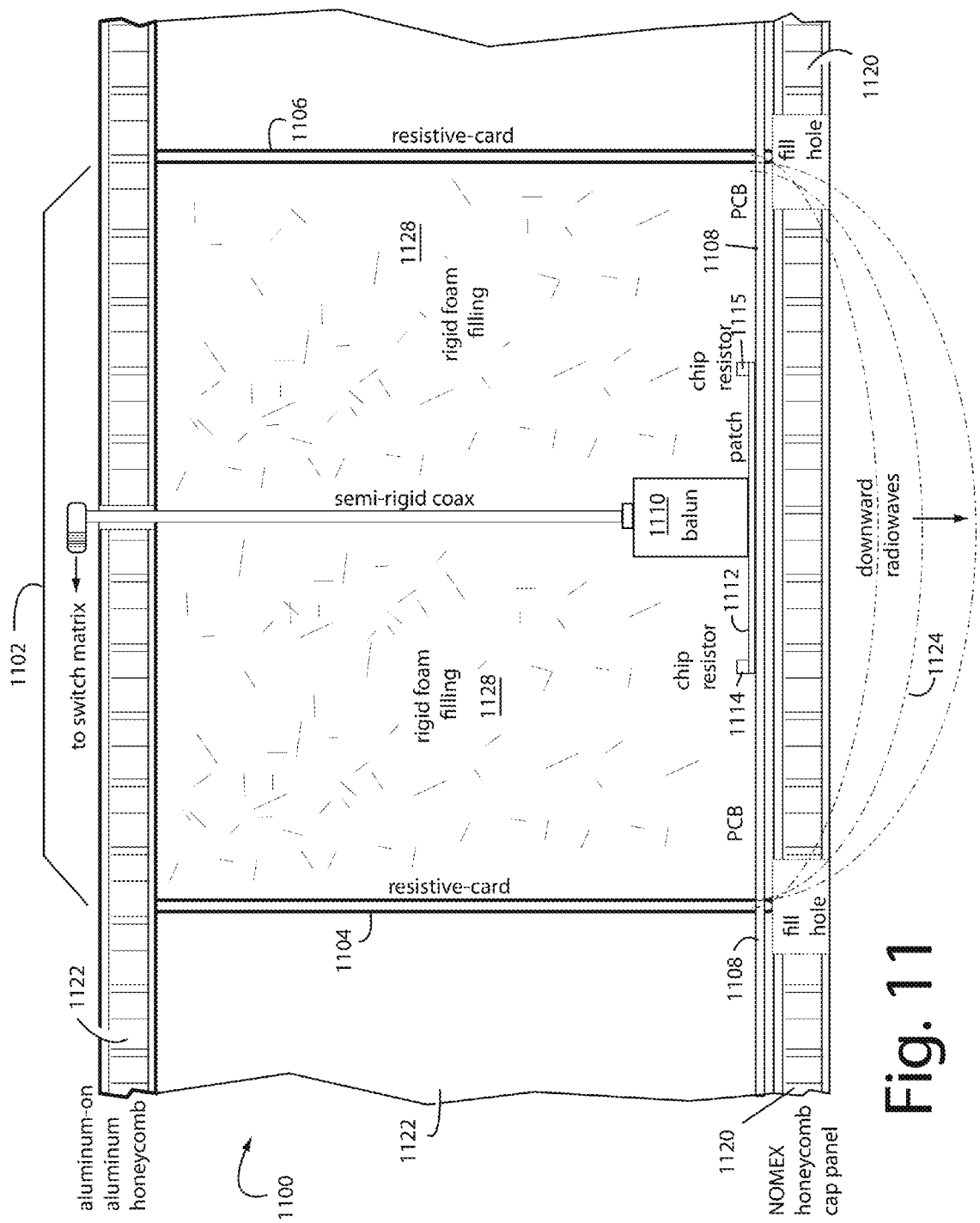
Figure 12:
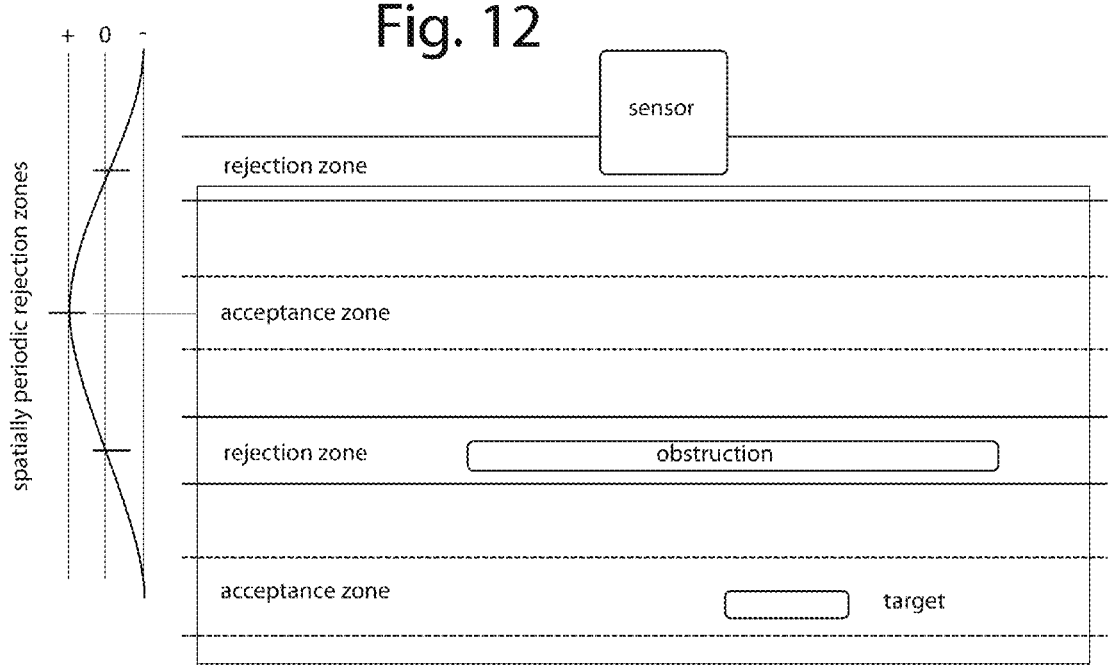
Figure 13:
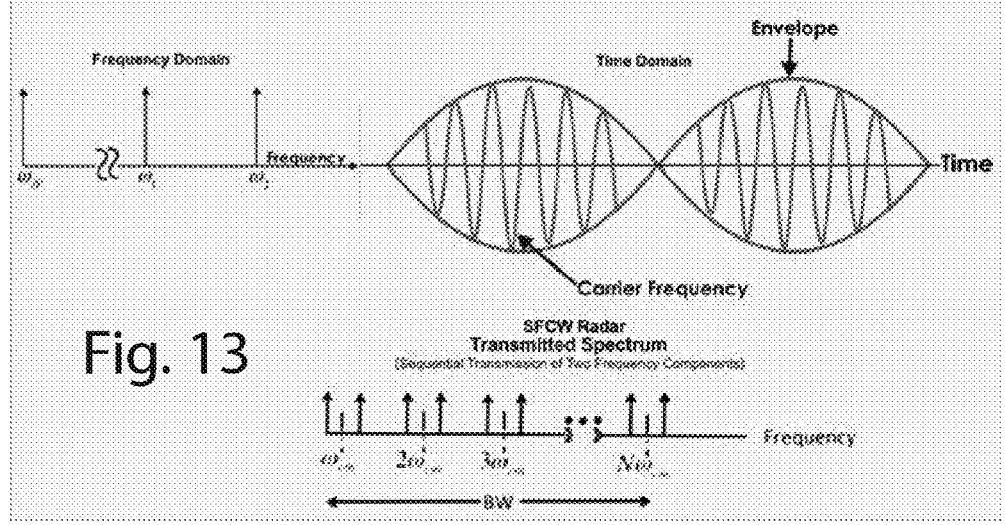
Figure 14:
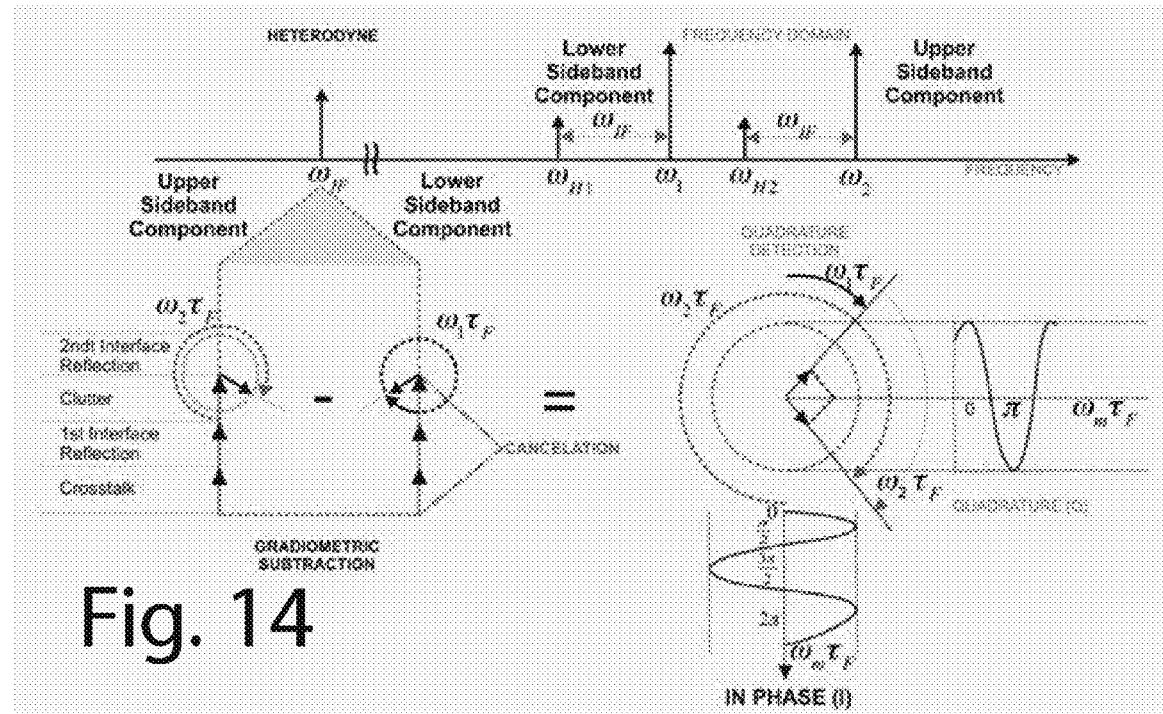
Figure 15:
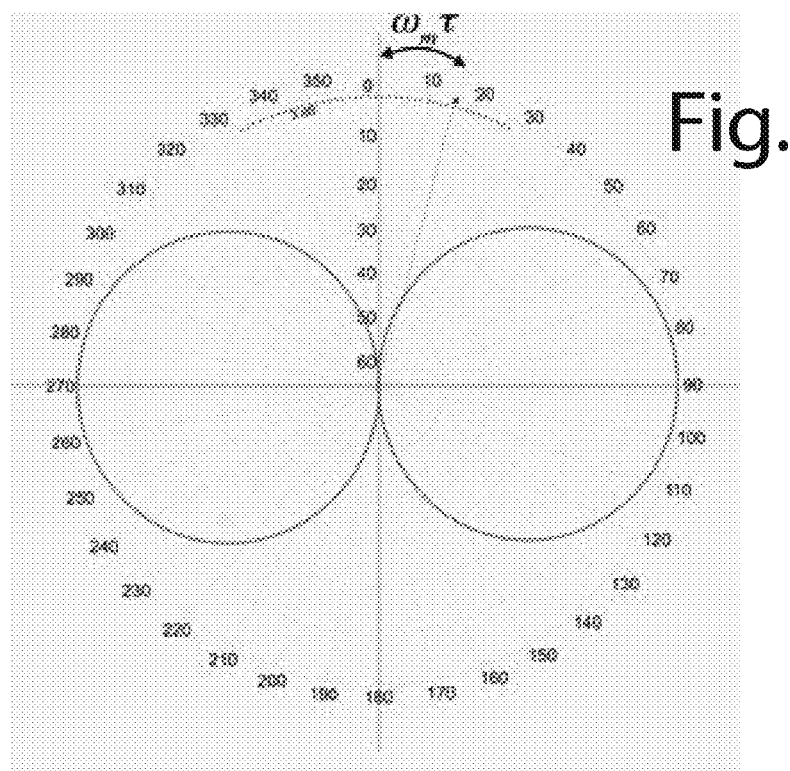

FIG. 3B another side view diagram of the ground imaging system and ground vehicle of FIG. 1A, but showing how the antenna array has been pivoted up to point forward into free space for antenna calibration;

FIG. 4 is a perspective view diagram of one way to construct an antenna switching matrix;

FIG. 5 is a perspective view diagram of a lateral antenna array that can be pivoted up to point forward on cantilevered boom to allow for calibration and stowage;

FIG. 6 is a partial cutaway diagram of a portion of the lateral antenna array of FIG. 5 showing how the various individual dipole antenna compartments are separated with lightweight resistive-cards to control and reduce crosstalk in one embodiment of the present invention;

FIG. 7 is a perspective view exploded assembly view diagram of an antenna array like those shown in FIGS. 1A, 1B, 2, 3, 5, and 6. Only the top portion is shown, upside-down, to illustrate how dozens of resistive cards are captured and held without brackets and fasteners by folding together the panels over them;

FIG. 8 is a top view diagram of a triple dipole antenna arrangement on one printed circuit board. A typical application would use eight such PCB's arranged edge-to-edge to make an array of twenty-four;

FIG. 9 is a top view diagram of a single one of the dipole antennas of FIG. 8, and schematically shows the electrical connection and matching needed to the antenna switch matrix;

FIG. 10 is a perspective view diagram of the balun as used in FIGS. 8 and 9, and is intended to provide insights into how the baluns can be constructed for rugged service in the application illustrated in FIGS. 1A and 1B; and FIG. 11 is a cross sectional view diagram of the lateral antenna array of FIG. 1A taken on a left-right lateral, vertical plane, and showing the rigid foam filling that is expanded between resistive cards in each dipole antenna compartment;

FIG. 12 is a graph of an example of a spatially-periodic zoning of the DSB response, where a modulation frequency is manipulated to skew and span high rejection and high target response spatial zones to optimally suit a particular inquiry;

FIG. 13 is a waveform diagram of a double sideband suppressed carrier;

FIG. 14 is a phasor representation of the gradiometric heterodyne process and quadrature detection of the far zone reflected I and Q Signals, from U.S. Pat. No. 6,522,285; and FIG. 15 is a diagram of the Bausov Suppression Factor, wherein the two circles represent the near zone suppression dependence on modulation frequency ($\omega m$).

DETAILED DESCRIPTION OF THE PREFERRED EMBODIMENT

The detection of shallow and more deeply buried objects in the ground by conventional radar is plagued with high false alarm rates (FAR) and low probabilities of detection (PD). Nevertheless, many objects-of-interest exist in the ground all over the world that need to be found. But finding them is complicated because they include metal, low metal and dielectric objects, all buried in the near surface layers. Deeper buried objects-of-interest include wires, pipes, and tunnel bores.

Embodiments of the present invention leverage multimodal ground penetrating radar (MMGPR) approaches for new highs in performance when mounted on vehicles, or dismounted and handheld in small, lightweight and low-power (SWAP) instruments.

Any detection and characterization of buried objects by radar or active sonar is complicated by unavoidable geologic clutter and surface reflections. Some of this geologic clutter results from differential soil compactions and vegetation deposits. Material bulk impedances can vary 12-120 ohms, and even drift with the time of day, temperature, and the weather. Shallow and deep meandering Paleochannels add to the clutter. The detection problems are compound when the objects very shallow near the free space-soil interface, and also when they are very deeply buried in slightly conductive soils.

Figure 1:
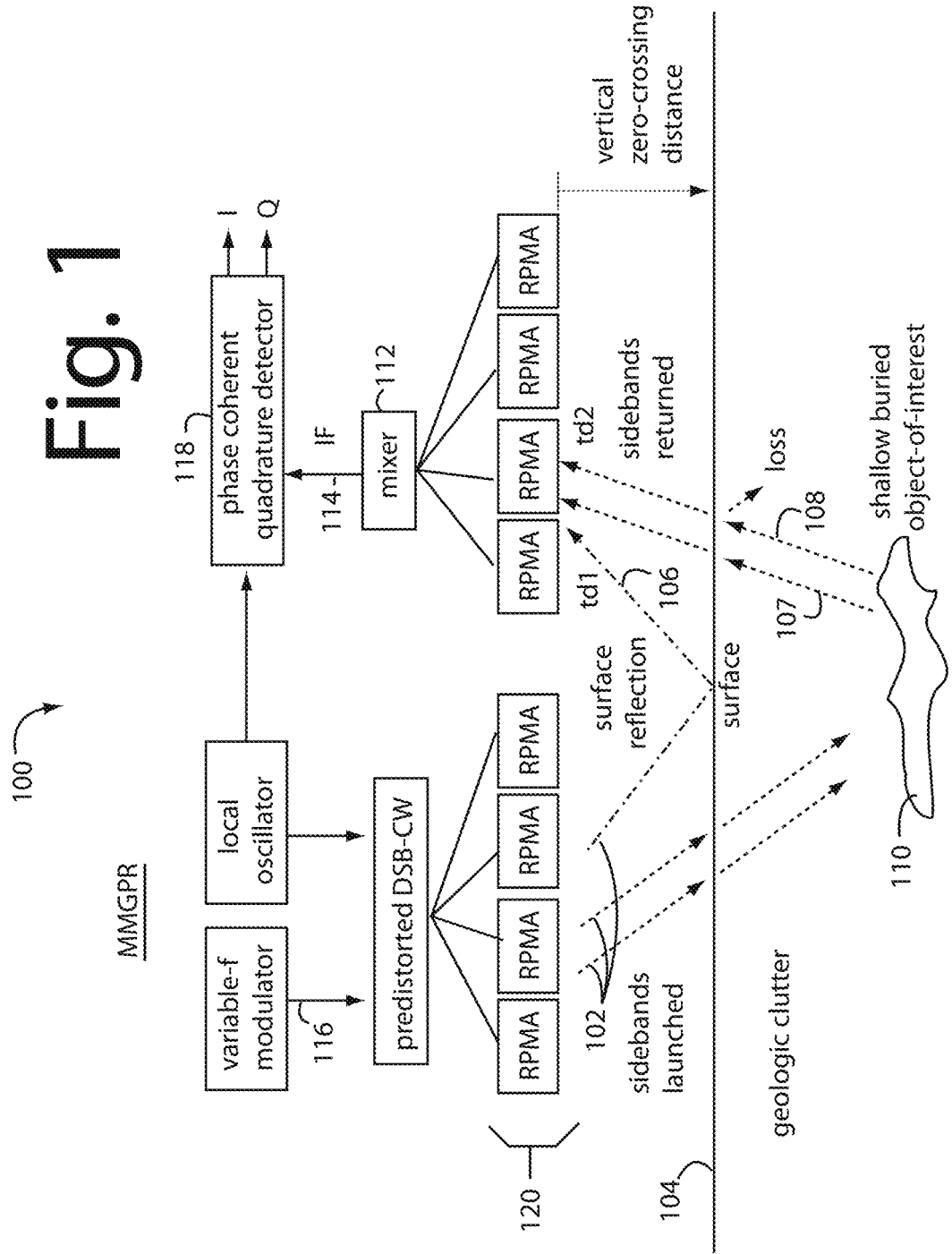
FIG. 1 is a functional block diagram of a multi-modal ground penetrating radar (MMGPR) embodiment of the present invention which launches predistorted double-sideband (DSB) suppressed-carrier modulated continuous waves (CW) to illuminate and penetrate a ground surface.

FIG. 1 represents an MMGPR embodiment 100 of the present invention which launches predistorted double-sideband (DSB) suppressed-carrier modulated continuous waves (CW) 102 illuminate and penetrate a ground surface 104. The continual illumination causes multiple copies 106-108 of the lower sideband (LSB) and upper sideband (USB) to be reflected and returned to the radar after being affected by corresponding phase and time delays, and attenuations proportional to the depth of the corresponding reflecting objects 110. The surface reflections 106 will be only slightly attenuated or phase delayed, e.g., less than a nano-second. Embodiments of the present invention will reject and tune out these early arriving returns by self-cancellation of the USB with the LSB.

All the LSB and USB returns 106-108 are continually heterodyned in a radar receiver mixer 112 into an intermediate frequency (IF) 114 representing an original modulation frequency 116 that existed at the time of launch.

The respective pairs of LSB and USB signals 106-108 returned will ordinarily be of equal amplitudes. Those returned from the surface, reflection 106, will be near zero time and phase delayed and 180° out of phase with one another and thus will be automatically suppressed in a gradiometric heterodyne nulling process, e.g., detector 118.

Later arriving return signals 107-108 from more deeply buried object 110 are detected in the phase coherent quadrature detector 118 by varying the modulation frequency 116 and any observing rapid variations in sinusoidal signals from the coherent quadrature detector 118.

The MMGPR DSBg radar 100 provides a sinusoidal spatial clutter and reflection elimination along the vertical transmission path between the radar sensing antenna 120 and the buried object 110. Inter-digitated minimum and maximum suppression responses occur at a multitude of ever deeper periodic zero crossings. Where these zero-crossings occur in depth is adjustable via the modulation frequency 116.

The relative suppression of "early arrival time" electromagnetic fields 106 with respect to the "late arrival time" electromagnetic fields 107-108 from the deeply buried tunnel objects 110 will be maximized when the 90-degree phase shift along the roundtrip travel path is adjusted to match the object depth. The suppression is dependent only on the separation frequency between the two sidebands, the modulation frequency is one-half of the separation frequency. So, the modulation frequency 116 is manipulated to maximize the relative suppression, object-by-object, depth-by-depth.

Minimum suppression, e.g., signal enhancement, occurs at the maximums of the function. The vertical zero crossing distance to the first interface (ground surface 104) is set using computerized phase control to predistort the lower and upper continuous wave sidebands. When the zero crossing is set equal to the roundtrip time from the surface 104, the usual interface cluttering reflection will be maximally suppressed.

Narrow bandwidth transmission enables the radar sensing antenna 120 to be constructed with laterally arranged, single-file multiple frequency resonant microstrip patch antennas (RMPA's). Resonant detection techniques increase the detection sensitivity of shallow buried metal, low metal and dielectric objects when the radar is operated at a resonant scattering frequency of the object.

For objects buried in the interface 104, the sinusoidal spatial clutter and reflection elimination function minimum (cosine) is set to coincide with the interface. In this case, the geologic clutter, first interface reflection 106 and scattering electromagnetic field components are early time arrivals at the sensors antenna 120. Each RMPA exhibits orthogonal antenna $S_{11}$ impedance variations when the sensing antenna traverse crosses over metal or dielectric objects. RMPA's inherently have edge electromagnetic (EM) fields that can detect low conductivity graphite conductors.

RMPA's have been successfully adapted in security imaging systems to the detection and imaging of explosives concealed under clothing. High power double-sideband (DSB) transmissions may be useful in heterodyne generation by non-linear electrical parameters of objects for detection and characterization. Combining double-sideband gradiometers (DSBg) with sinusoidal spatial clutter and reflection elimination yields a multi-mode detector capable of shallow and deeply buried object detection. Such can characterizes targets using their electrical parameters as well as non-linear response. The double-sideband gradiometer radar was first developed for underground mining by Stolar Research (Raton, N. Mex.) to detect abandoned mines ahead through 57-feet of coal. And it has been effectively applied in clandestine tunnel detection.

FIGS. 3A and 3B represent a ground imaging system 300 that uses a small truck to suspend a lateral antenna array close over a roadway as it travels along. FIG. 3B illustrates how such antenna array can be pivoted up to point forward into free space for antenna calibration, maintenance, and system health checks. A truck 302 is normally driven over a relatively flat surface 304.

A random clutter 306 of shallow, subsurface objects will typically collect in, on, and under flat ground 304. These represent pieces of municipal infrastructure, natural artifacts, long ago buried debris, and recently buried things. Random clutter 306 can also include water flows, puddles, blowing debris, morning dew, and other objects carried along or caused by the local weather. Above-the-surface and very shallow objects that are usually of no interest are excluded from investigation when an exclusion zone 308 is electronically implemented with radar techniques described herein.

During operation, a lightweight, multi-element, multi-compartment, lateral linear antenna array 310 is lowered down into position on a hydraulic or winched boom 312 about one foot over flat ground 304. A global positioning system (GPS) navigation receiver 314 is used to repeatably and continuously report the accurate positions of the antenna array 310 in realtime during each run along the same path. The navigation information helps in later passes to register target observables. A kind of voting or probability normalization can be used if several or even dozens of collection runs are stored in a database together. Each additional run can help build confidence in the data and eliminate false positives.

A so-called P-code authorized GPS receiver type would be advantageous because of the high navigation solution rates and accuracies obtainable. A pair of modems 316 and 318 communicate radar information obtained about the subsurface clutter 306 to an electronics module 320. Modem 316 includes an antenna switching matrix for selecting which of dozens of individual dipole antenna elements in the linear antenna array 310 will be activated for use as a transmitter and which other antenna element is to be used as a receiver at any one instant. In general, the frequency ranges used for such GPR are 300-MHz to 400-MHz, about one meter or more in wavelength.

The electronics module 320 is ruggedized to operate and survive years of hard service on a moving truck 302. It is essentially a general purpose computer and radar signal processor with software-defined functionality provided by a firmware program 322. A user display 324 is provided for a driver. A battery box 326 includes rechargeable batteries, a charger, and voltage/current regulation. Such battery box 326 provides uninterruptable power to the electronics module 320.

In operation, battery power voltage taken from the vehicle will show the boosting effects of its generators, e.g., input voltage exceeds 28.0 volts. But when the vehicle is shut off that input drops to zero and the internal batteries must take over. They will sag in voltage under load to 24.0 to 28.0 volts at the output, depending on charge and discharge duration. The electronic module 320 is equipped to sense this drop and is programmed with firmware 322 to commence an immediate, but orderly shutdown. The battery box 326 will deplete in a few minutes under maximum load.

Firmware program 322 executes on a microcomputer within electronics module 320 to bring in and process ground penetrating radar (GPR) signals 328 and GPS navigation data. Each item of subsurface clutter 306 is cataloged, characterized, and logged by its location under the flat ground 304 into a log. If the collection is a first pass, the data is logged into a log-1 330, or if a second pass then into a log-2 332. They are compared and registered by a coherent change detection (CCD) processor 334. If the first and second passes log-1 and log-2 were perfectly registered with one another they could simply be subtracted and the difference would represent any newly arrived clutter 306.

Eliminating artifacts observed in the exclusion zone 308 would further reduce the analytical chore of characterizing each new object detected in clutter 306. Alternative embodiments of the present invention depart from this prior work in that shallow clutter at the surface in exclusion zone 308 is completely rejected by a suppressed carrier, double-sideband method already patented by the present inventors. See, U.S. Pat. No. 7,656,342, issued Feb. 2, 2010. The depth of data collection is typically limited to those depths of objects that can be easily or inadvertently exposed or disturbed by surface vehicles, e.g., no more than a foot or two of depth. Other applications will require deeper investigations.

Practical, real world coherent change detection (CCD) processing of GPR signals 228 obtained from multiple sweeps, passes and scans is described in more detail in Published United States Patent Application, US 2013-0050008, by Robert Atkins, et al., published Feb. 28, 2013.

Invariably the location logging according to GPS fixes will not be ideal and contain errors of scale, skew, position, and solution uncertainty. Display 324 is provided for the driver to follow a particular path, but no two vehicle passes down flat ground 304 can ever be identical. It therefore falls on the firmware program 322 to include coherent change detection. Current radar data is therefore registered to prior data on a scan-by-scan basis by novel pattern-matching algorithms. The registration process adjusts the vehicle height and roll data to compensate for pass-to-pass differences in pitch, roll, and elevation. The characteristics and signatures of the subsurface objects 306 are used to determine the current location of the antenna array 310 relative to previous passes.

Antenna array 310 must be lightweight and rugged in order to be usefully employed this way on a long boom 312. The exact nature and detail of its construction are described in copending patent applications filed by the present inventors. The antenna array 310 is electronically and mechanically configured to allow pass-to-pass compensation of the unavoidable offsets that will occur. The constituent antenna elements are resistively loaded patch dipoles in a linear array of elements, and are very closely spaced only a small fraction of a wavelength apart. The operational result is most of the antenna elements on a current pass will be within a fraction of a wavelength from the true position of a corresponding element on a previous pass. CCD registration is used to adjust which antenna elements are to be selected by the switching matrix in modem 316.

The individual patch dipole antenna elements are enclosed in a box-cavity and backplane that shields the array of them from the radio environment to the sides and above. The box enclosure acts to produce a directional ground penetrating radar beam 328 downward into the flat ground 304. The virtual position of the antenna array 310 can be electronically shifted left-right element-by-element. The signals received at the new element positions can be used to coherently cancel with historical signals received previously by each element position prior to any virtual shifting the array.

Such use requires that every element must be an electronic match to its neighbors, both in the near-field and the far-field. So, any cavity modes associated with the box-shaped cavity are necessarily suppressed. Lossy, high dielectric ferrite tiles are used as end-caps on the array, and resistive cards are inter-digitated between the antenna elements to reduce mutual coupling.

The conceptual details of such an antenna array and its operation in this application are outlined by Robert Atkins, et al., in United States Patent Application US-2013-0050008-A1, published Feb. 28, 2013, and such is incorporated herein, in full, by reference.

Boom 312 must also be lightweight, rugged, articulated, and easily removed and reinstalled by drivers/technicians. It should be constructed such that it can raise up antenna array 310 up out of harm's way while driving between jobs. And yet the boom must be able to be reliably and quickly lowered back down to begin operations over the roadway and at a consistent height. A terrain following or collision avoidance mechanism could also be advantageous.

In general, embodiments of the present invention include and make possible the design, fabrication, and testing of hardened, rugged, mobile, and deployable ground penetrating radar hardware. This means the equipment must be able to function reliably and consistently while being abused by operators, bad weather, harsh environment, strong vibration, extreme heat, and even bullets.

In one application, each scan will sequentially employ every antenna element as a transmitter with every other antenna element as a receiver for the instant transmitter. Synthetic-aperture radar (SAR) is very similar, where finer spatial resolutions are made possible across the breadth of a roadway. But here, the lateral SAR antenna movement is virtual and controlled electronically in steps by the switch matrix. Longitudinal SAR antenna movement is real and obtained in steps, scan-by-scan as vehicle 302 moves along flat ground 304.

Characteristic patterns in the radar data obtained from the shallow buried objects 306 and GPS 314 are used to control the switching matrix so that virtual radar data can be collected from the same antenna-pair perspectives above roadway 304 on a second pass that were used during a first pass.

Registering successive scans to each other is needed to cancel out the adverse effects caused by the antenna array 310 passing along slightly offset pathways. Keeping the vehicle pathways exactly the same on subsequent passes would only be possible with something like a railed vehicle on a railroad track. Otherwise, with a wheeled vehicle steered by a driver there needs to be some electronic compensation employed to normalize the scans obtained on serial passes.

The necessary scan rates are empirically derived from vehicle speed, target signal-to-noise ratios (SNR), and the object-of-interest resolution required along-track. A scan rate of 50 Hz to 100 Hz would be typical at a vehicle speed of 10-MPH.

The close physical spacing of the antenna elements can allow significant levels of signal cross coupling amongst them. They are therefore phase matched, electrically compartmentalized, and resistively loaded. The transmit beams and receive patterns are normalized in both the near-field and the far-field.

The system described by Atkins (US 2013-0050008) is not so easily mounted to a vehicle and operated in the field at remote locations. The pieces must be economical to manufacture, and easy to install, operate, and maintain. They must not be overweight or overload the cargo carrying abilities of the vehicle, nor can they demand excessive levels of battery power. How all these things are done is the subject matter of the present invention.

Antenna array 310 occasionally requires calibration. In order to do this the antenna array 310 needs to be rotated to point forward or be lifted up so that all it "sees" is free space. As an example, as in FIG. 3B. The mounting system is therefore configured to enable such calibrations in the field.

FIG. 4 represents an antenna switch matrix 400 in an embodiment of the present invention. The antenna switch matrix 400 needs to be constructed very ruggedly and its enclosure 402 provides a protected environment for a large printed circuit board inside. Several coax barrel connectors 404 are bulkhead mounted along all four edges. These are interconnected with the individual dipole antennas by equal length, matched coax cables 406. The antenna switch matrix 400 mounts in its own compartment on top of the lateral antenna array 310 (FIGS. 3A and 3B).

FIG. 5 represents a lateral antenna array 500 on an adjustable cantilever boom 502 for mounting on a vehicle's front bumper 504. In one embodiment, the lateral antenna array 500 comprises two dozen microwave dipole antennas in a compartmentalized liner array. In operation, the lateral antenna array 500 is pointed downward into a roadway 506 to electronically image buried objects below the surface in soils 508. For example, it could be used to locate land survey markers that were paved over by overly enthusiastic asphalt crews.

These two dozen compartmentalized microwave dipole antennas are individually and separately connected via short coax cables to a switch matrix 510. The switch matrix 510 can instantly select which antenna is to be used for transmitting and which is to be used for receiving.

A swing mount 512 mechanizes the lateral antenna array 500 to be able to swing up under winch or hydraulic power to point forward for calibration or to be stowed up out of the way. (Calibration requires free space be in front of the antennas so they are not loaded and a baseline can be established.) A pair of struts 514 and 515 push the lateral antenna array 500 out on a cantilever and are terminated on their distal ends by hinges 516 and 517.

For a lot of reasons, not the least of which is good weight balance when mounted on a vehicle, the lateral antenna array 500 must be as lightweight as possible. Therefore thin-wall aluminum is used as much as possible throughout for the structural components. A principal goal is to keep the weight under one hundred pounds.

FIG. 6 represents a portion 600 of the lateral antenna array 500 of FIG. 5 showing how various individual dipole antenna compartments 601-612 are separated with lightweight resistive-cards 621-632 to control and reduce crosstalk, e.g., in one embodiment of the present invention. An outer aluminum on aluminum honeycomb panel that covers the top, front, and back is essentially shown in FIG. 6 as removed. More details about this aluminum panel are described with FIG. 7.

A ferrite tile end cap 640 completes the outside ends of the antenna array 600. Each dipole antenna 641-652 is carefully matched to the others so the antennas can be "moved" electronically by switching without introducing artifacts that would confuse the measurements obtained. Here, dipoles 649 and 652 are shown as radiating downward beams 654 and 656.

FIG. 7 represents the unique way that an outer aluminum-on-aluminum honeycomb panel 700 is slotted inside to capture the tabs on a number of resistive cards 702. FIG. 7 shows panel 700 upside-down. During manufacture, a row of top tabs 704 on resistive cards 702 are dropped into corresponding inside-top slots 706, while front 708 and back 710 are folded up to engage tabs 712 and 714. Panel 700 thereby covers the top, front, and back of antenna array 500 (FIG. 5).

In a later manufacturing step, bottom rows of tabs 716 on resistive cards 702 will be used to engage corresponding slots on a lateral row of dipole antenna printed circuit boards (PCB) described with FIG. 8.

A pair of aluminum end-caps 720 and 722 electrically close the ends of the antenna array and provide some loading and interference suppression with ferrite tiles, e.g., 724. Such ferrite tiles are epoxied to the inside surfaces, and end-caps 720 and 722 are fabricated into shallow open end rectangular boxes folded on a brake from sheet aluminum. In instances where the ferrite tile material must be puzzled together from smaller pieces, a sheet of epoxy-fiberglass board is epoxied on over the width of all of them to add resistance to vibration.

FIG. 8 illustrates a dipole antenna printed circuit board (PCB) 800 in an embodiment of the present invention. Each PCB 800 has three resistor-loaded planar dipole antennas 801-803 arranged shoulder to shoulder and on the same plane. PCB 800 is illustrated here from the top side which receives a balun 805-807 at the center of each dipole. The baluns 805-807 provide impedance matching to interconnecting coaxial cables that route to a switch matrix, and match the balanced radiating elements to the unbalanced transmission line.

Eight such PCB's 800 are assembled side-by-side, baluns up, within the open bottom of the aluminum-on-aluminum honeycomb panel 700 (FIG. 7). These fit onto twenty-two resistive cards 702 to form a twenty-four dipole lateral antenna array like 500 (FIG. 5). The whole box is filled with two-part, expanding urethane foam to make it rugged and weatherproof.

The construction of each dipole antenna 801-803 is unusual, for example in the case of dipole antenna 801, five patch elements on each side 810-819 are interconnected with corner resistors 821-838. The tip-to-tip dipole width was about 18" in one application. The balanced side of balun 805 connects between the centers of patches 814 and 815. The result is a resistor-loaded planar dipole antenna able to operate in the range of 100-MHz to 400-MHz and able to suppress and reach beyond near-field clutter and confusion.

Broadband antennas can be created with resistive loading. Each antenna element can be fabricated throughout from a bulk resistive material, or just the corner ends can be loaded with lump resistors. Any resistive loading will diminish the propagating waves as they travel towards the outer ends, and this weakens any wave reflections back in from the ends. As a result, the antenna will not have a pronounced resonance, making it broadband. The input signals will be transmitted with less distortion and antenna ring. Such antennas are not very directive, and produce linearly polarized radiation patterns. The loss loading produces low efficiencies, but the reduced physical volume is a major plus.

A parade of dielectric and conductive objects passing through the near field of an antenna can change the loading ($Z_{in}$) and affect the size of the effective antenna. The corner resistors and segmenting of the patches suppresses and attenuates near field effects. The width of each patch provides a degree of bandwidth spreading, as opposed to dipoles having thin rods with sharp resonances for the radiating elements.

New features are included in PCB 800 to assist in the mechanical assembly of it into lateral antenna array 500 (FIG. 5). Specifically, slots 850-855 and notches 856-861 are cut into the fiberglass-epoxy base material to allow for the insertion of tabs 716 (FIG. 7) of resistive-cards 702. A number of circular fill holes 870-873 and half-round fill holes 874-877 are provided so two-part urethane foam can be poured into the empty cavities formed between the resistive cards 702 and end caps 720 ad 722. Such foam sets as a rigid matrix, but is highly insulative and has very little radio opaqueness. It "glues" and binds the whole together in a highly ruggedized assembly.

FIGS. 9 and 10 represent the electrical connection and the mechanical construction of a typical balun like those in FIG. 8. In FIG. 9, a balun 900 is shown connected on its balanced side 901 to a center pair of dipole antenna patches 902 and 904. An unbalanced side 906 of balun 900 connects to a coaxial cable 908 through a connector 910.

FIG. 10 illustrates how a balun 1000 can be constructed to withstand strong vibrations and physical abuse in the field. A center pair of dipole antenna patches 1002 and 1004 are connected to a balun transformer 1006. Both the balun transformer 1006 and a coax connector fitting 1008 are mounted to a fiberglass-epoxy printed circuit board 1010. Matching slots in PCB 1010 and supports 1012 and 1014 are inter-digitated and epoxied together to form a tower. The result is a very rigid structure highly resistant to damage from vibration.

FIG. 11 illustrates how a single dipole antenna and cavity are formed, constructed and joined. A part of a lateral antenna array 3100 includes as many as twenty-four individual dipole-antenna-and-cavities 1102. Each dipole-antenna-and-cavity 1102 is bounded on either lateral side by a resistive card 1104 and 1106, seen here on-edge from the front. A printed circuit board (PCB) antenna 1108 typically carries three adjacent sets of baluns 1110, patch elements 1112, and chip resistors 1114 and 1115.

An aramid fiber honeycomb sandwich-core material panel 1120 is used to enclose the bottom. It is joined all along the bottom-front and bottom-rear edges from end-to-end of an aluminum-on-aluminum honeycomb folded enclosure 1122, as in FIG. 7. DuPont NOMEX™ brand fibers in honeycomb is an industry standard lightweight non-metallic composite. Commercial grade honeycomb is typically made from aramid fiber paper coated with a heat-resistant phenolic resin. Such is resilient, has low density, and a superior strength-to-weight ratio. It is used here this way because downward radiowaves 1124 from antenna element patches 1112 will pass right through unimpeded. A number of fill holes 1126 in the honeycomb sandwich-core material panel 1120 and PCB 1108 are used to insert a 2-part urethane foam 1128 that expands and becomes rigid shortly after mixing its two liquid parts. The rigid foam filling 1128 fully encapsulates the antenna and interior cavity.

Any mechanical braces, brackets, or reinforcements that must be placed inside individual dipole-antenna-and-cavities 1102 should be comprised of phenolic resin reinforced fiberglass, so as to be radio translucent. For example, the attachments necessary for boom 212 (FIG. 2) to the antenna array 310. Small steel fasteners used in conjunction with such brackets and braces seem to have little or no effect on radio function, and so can be used without having to resort to something more exotic.

The detection of shallow and deeply buried metal, low metal, and dielectric objects using ground penetrating radar is complicated by the rapid vertical and horizontal changes that can appear in the electrical parameters measured in the near-surface stratified layers. The stratification in clay based arid lands develops from dry, fine dust that transitions into thin aqua-strict layers predominated by soluble salts of various elements in the Periodic Table. Differential compaction and vegetation further add to the problems in GPR detection. Deeper anomalies of differentially compacted layers are the result of Paleochannels meandering through. Localized differential compactions can collect moisture into forms looking like conductive solid objects.

The non-isotropic electrical conductivity, dielectric constant and magnetic permeability values of the ground layers can change significantly along horizontal traverses of the sensing radar antenna when moving over a buried objects. If the loss tangent ($\sigma/\in\omega$) of the layer is much greater than unity, the electrical conductivity will increase with frequency and can range from 0.005 to 0.2 Siemens per meter. The relative dielectric constant ranges from 4-to-34 in mud, and magnetic permeability from 2-to-100 in volcanic regions. The spatial electrical parameter values of the near surface layers cause the soil impedance to ranges from 12-ohms to more 120-ohms, varying with time of day and weather. Free space-soil impedance mismatches cause reflections and lateral surface electromagnetic field components to form at the interface.

Any motion of the antenna sensor above the surface adds to the detection problem. The quasi-random variation in the magnitude and phase of reflected electromagnetic field components is referred here as geologic clutter. Geologic clutter can increase the detection false alarm rate (FAR) and decrease the probability of detection (PD).

Objects with low contrast can often lie in an interface layer just below the surface. Radar illumination of the object creates observable scattered electromagnetic field components that will arrive early back at the radar sensing antenna, e.g., in the sub-nanosecond time period. The reflected, geologic clutter and object scattered fields are phase coherent fields and essentially arrive with nearly identical roundtrip travel times.

The group of reflected and geologic clutter electromagnetic field components will often be several orders of magnitude greater than the scattered field components of interest coming from the target objects. The observable scattered fields from the objects are predominated by geologic cluttering reflected electromagnetic wave is one of the causes of the formidable but not intractable detection problem.

The propagation constants depend on the loss tangent when the electromagnetic wave travels through slightly conducting subsurface layers, significantly decreasing velocity and increasing the phase shift per meter. The scattered electromagnetic field components from deeper buried objects are phase coherent with the illuminating fields and arrive back to the radar in the nanosecond timeframe (e.g., late arrivals). The scattered field components from anomalies will be significantly shifted in phase from the early arriving electromagnetic field components, thus enabling a quadrature detection of the deeper buried objects.

The reflected and geologic clutter fields can be thought of as a superposition of stationary phasors. The lower and upper sideband (late arrival) scattered fields components from the object are also phasors, each phase shifted by its radian frequency multiplied by the roundtrip travel time.

The solution to the surface reflection and geologic clutter suppression problem has been addressed by coherent transmission of predistorted lower and upper sidebands separated by one half of the modulation radian frequency. Each coherent spectral component arriving back to the radar is heterodyne to an identical intermediate frequency (IF). By predistorting the phase of each heterodyne frequency component, the cluttering reflected lower and upper sideband continuous wave electromagnetic field components (phasors) arriving at the radar receiver are almost identical in magnitude, but are phase shifted so as to be exactly out of phase with one another.

A microcomputer controlled heterodyne process can be used for gradiometric suppression. This gradiometric method reduces the number of bits required by analog-to-digital conversion. Another advantage is the physical distance to the surface reflection and geologic clutter suppression point can tuned by automatically predistorting the phase of the lower and upper sideband spectral components. A still further advantage is the modulation frequency, one half of the sideband separation frequency, can be jiggled about to determine how deep the object causing the signal return is buried.

Predistorted gradiometric radars do not require wide bandwidth transmissions to achieve spatial resolution. Stepped-frequency continuous wave (SFCW) radars do. Multiple spatially separated objects of interest seldom occur in the subsurface because of burial difficulty or depth limitations caused by attenuation of the electromagnetic field components traveling through slightly conductive stratified layers of the earth.

Narrow bandwidth resonate microstrip patch antennas (RMPA) can be used here. This type of antenna has minimum back lobe sensitivity and doesn't need absorbing materials that can get quite heavy. Multiple RMPA's can be stacked together, so as to find one to resonate at a critical detection frequency.

Figure 2:
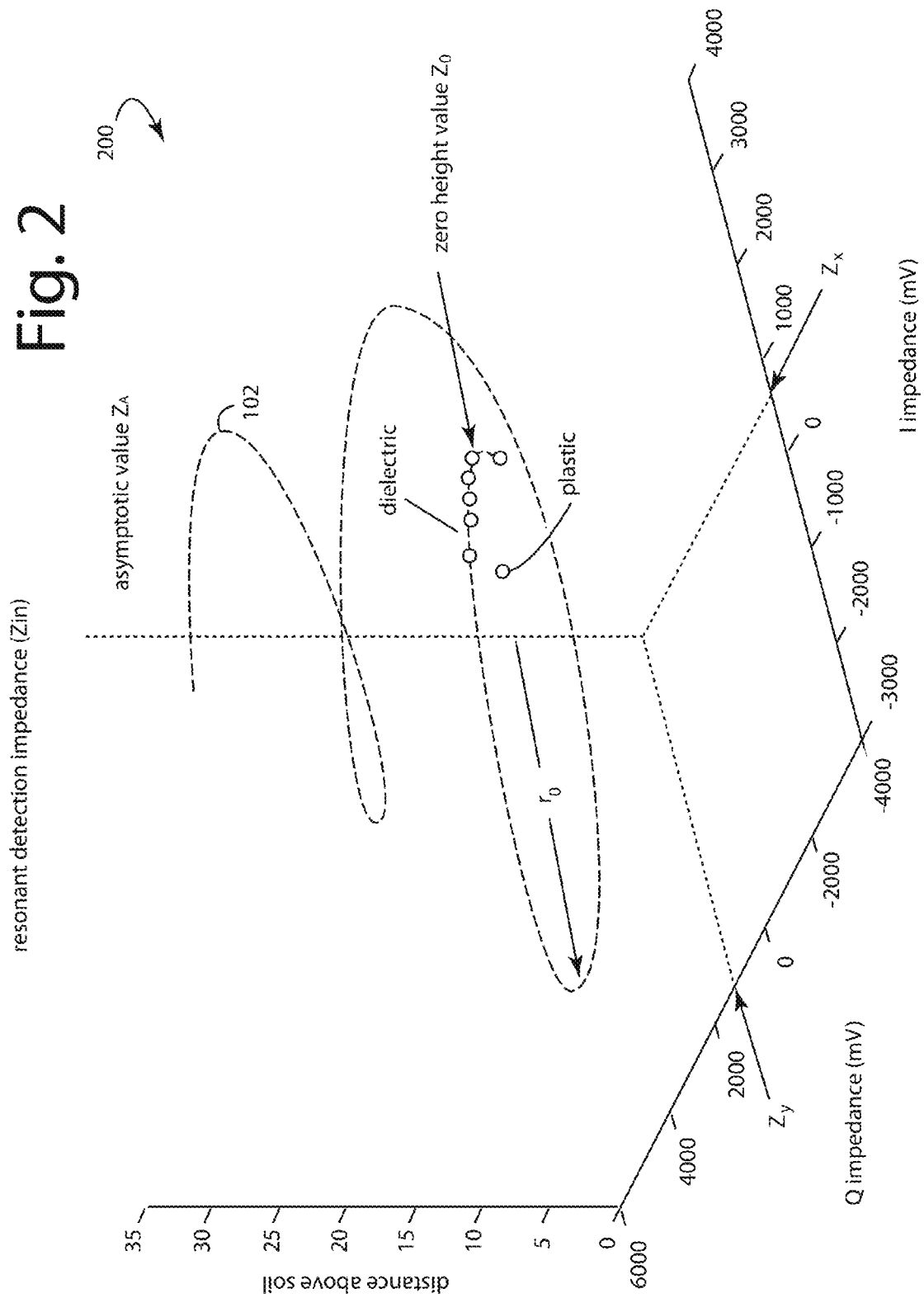
FIG. 2 is a three dimensional chart of the changes in real ($Z_x$) and imaginary impedances ($Z_y$) that occur in the input impedance of a resonant microwave patch antenna (RMPA), automatically kept in resonance, with observable target objects buried at various depths below the ground soil interface.

As seen in FIG. 2, the RMPA driving point impedance ($S_{11}$) exhibits a spiral like height dependence above an interface that changes in a predictable way that can be calibrated. The S-parameter is basically the magnitude of the reflection coefficient, which depends on the antenna impedance. Interesting observables manifest as orthogonal impedance variations from the run of the calibrated spiral. Such pops occur as the antennas traverse along over shallow buried metallic and dielectric objects. The directions, in or out, of orthogonal variations help to classify the objects as metal or dielectric. For example, resonate scattering from tank, vehicle and antipersonal mines have been observed at approximately 150-MHz, 300-MHz and 600-MHz, respectively. Typical operation of the short wavelength DSBg radars is in the VHF and UHF spectrums.

Large electric and magnetic field components in the lower and upper sideband continuous waveforms can mix into heterodyne frequencies in electrically nonlinear medias. The coefficients in the power series representation of the nonlinear electrical parameters in the media can be determined by the rate of frequency change in the heterodyne signal with the changes in modulation frequency. A DSB radar could be used in the characterization of natural media and illuminated objects.

DSB radar is significantly different from pulse-based GPR techniques and is more closely-related to traditional radar techniques that rely on continuous-wave (CW) excitation and response such as frequency-modulated CW (FMCW) or stepped-frequency CW (SFCW). Pulse-based GPR techniques are challenged by geologic clutter and the requirement for wide RF bandwidth if they are to support high spatial resolution. The DSB gradiometric method, on the other hand, provides excellent first interface reflection and geologic clutter rejection of up to 70-dB. Each radiated sideband can be predistorted in phase order to specify spatial distance to maximum suppression location. Spatial response zoning of the DSB radar suppresses GPR crosstalk, as well as the extremely problematic first-interface reflection and geologic clutter at the Free space-soil interface that limits the dynamic range of other GPR techniques, and thus absolute detection depth.

An example of the spatially-periodic zoning of the DSB response is shown in FIG. 12, where a modulation frequency (116 in FIG. 1) is jiggled about in order to skew and twist high rejection and high target response spatial zones to optimally suit a particular inquiry. For example to null out an obstruction. This DSB gradiometric method can achieve up to 70-dB of clutter rejection for sensor cross-talk and first-interface "blinding" reflections. It also allows for tunable skip-zones to achieve a spatial zooming-in effect.

The following table below compares a DSB gradiometer with a conventional ground penetrating radar.

| Operating Parameter | DSB Ground Penetrating Radar Gradiometer | Short Pulse or Stepped Frequency Continuous Wave Radar |
| --- | --- | --- |
| First interface reflection suppression | 70-dB | 30-dB max |
| Clutter rejection | 70-dB | Algorithmic signal processing methods that improves PD, and reduces FAR |

| Operating Parameter | DSB Ground Penetrating Radar Gradiometer | Short Pulse or Stepped Frequency Continuous Wave Radar |
|---|---|---|
| Additional A/D converter dynamic range | 40-dB for deeper detection | |
| Required antenna Distance (range) to an object | Narrow bandwidth Varying modulation frequency at only one point along trajectory over the object | Wide bandwidth Determines round-trip time from waterfall response |
| Transmission wave form | Two phase coherent continuous waves | Wideband spectra |
| RFI Rejection | Tunable to any null in RFI spectrum | No |

Conventional radars operate in free space and require high-range resolution (ΔR) to detect multiple targets. The traveling electromagnetic wave frequency components suffer spreading and object cross section reflection losses along the round-trip transmission path. The round-trip travel time in free space (Σr=1) is 0.914 nanoseconds/foot. The transmit to receiver signal path crosstalk isolation is typically near 30-dB, thus requiring that the arriving signal strength from a buried object be greater than the crosstalk signal by at least 10-dB. Short-time duration pulse radar uses gating of the received signal path to turn off during the outgoing radar pulse and any ring-down time period of the receiver input circuits. This type of radar cannot detect shallow buried objects. Signal processing algorithms are used here to increase the detection signal path signal-to-noise ratio by using matched filters in the intermediate frequency stage. Change detection algorithms can be applied to minimize stationary geologic clutter signals.

Ground penetrating radars transmit energy directly into the ground, and this spawns a number of concerns that must be addressed to realize deep object detection.

An group of reflected signal components arriving at the radar receiver input circuits will be phase coherent with respective transmit frequency components, and can therefore be represented as a linear superposition of all signals identified. Crosstalk arrives in a timeframe of less than a nanosecond because of its short travel paths. Free space-to-soil interface impedance mismatches cause reflections from the first interface along with crosstalk arriving in a sub-nanosecond roundtrip travel timeframe. Geologic clutter caused by soil compaction, vegetation, time and weather-dependent electrical parameter changes along the travel path will reflect in under a nanosecond roundtrip. Lateral waves can be reflected from nearby surface objects and can arrive in nanosecond roundtrip travel timeframes.

Any signals that manage to pass through the first interface will have been attenuated by the media, spreading, loading, cross-section reflection losses, and internal reflection losses occurring at the interface. The signals shift significantly in phase every meter of their travel, and slowdown in proportion to the layer loss tangents. The observable signals from buried objects can drop 47-dB below the crosstalk and first-reflection signal levels, and even more when the objects-of-interest are buried in conductive clay soils. The roundtrip signal travel times are often several nanoseconds.

The suppression data is essentially the same over a range of 150-MHz to 600-MHz, with a modulation frequency of 10-MHz. Short wavelength DSBg radars transmit two-phase coherent, double sideband spectral components that reflect from the interface and are scattered from objects and return to the antenna.

Two coherent continuous waves (CW) arriving back are separated by twice the modulation frequency and are separately heterodyned down to the same intermediate frequency (IF). These down-conversions are digitally phase controlled to put the two interface reflection signals out of phase by 180-degrees.

Frequency components arriving later in time can be represented as two phasors that rotate with the modulation frequency, producing the sinusoidal observable in the coherent detection process. The virtual suppression and acceptance zones can be skewed up and down in the detection depth range by digitally manipulating the frequency and phase shift of each component in the transposition process.

For an output $(S/N)_o = 20$ dB $$S_T^{20} = -166.8 + 10 \log_{10} BW + 10 \log_{10} NF \text{ dBm},$$

where, BW is the detection bandwidth of the receiver in Hz and NF is the noise figure of the receiver.

The received signal $S_T^{20}$ produces a 20-dB signal-to-noise ratio (SNR) in the receiver detection signal path. The first right-hand term (-166.8-dBm) represents a signal of 1.02 nanovolts that produces a signal-to-noise ratio (SNR) of 20-dB in the receiver signal detection path. The far right-hand term represents the threshold detection sensitivity degradation due to receiver noise figure. Typically, a well-designed receiver will exhibit a noise figure near 2-dB. The middle term shows that the detection bandwidth (BW) is the predominant factor in the receiver design problem.

Radio geophysics requires the understanding of the above detection sensitivity equation. Modulation processes that require wide occupied bandwidth significantly degrade detection sensitivity. Increasing the detection bandwidth by a factor of ten, requires an increase in transmit power by a factor of ten when compared to a companion receiver design optimized for minimum occupied bandwidth detection. A 10-watt transmitter will need to be increased to 100-watts if the detection bandwidth is increased from 300 Hz to 3,000 Hz. However, a 100-watt transmitter cannot be made intrinsically safe.

The detection sensitivity of the radio frequency method (RIM), through-the-earth (TTE), MF analog, and MF digital receivers is $$S_i^{20} \begin{bmatrix} -164.8 \; db_m \; BW = 1 \text{ Hz } RIM \\ -154.8 \; db_m \; BW = 100 \text{ Hz } TTE \\ -130.8 \; db_m \; BW = 6.25 \text{ kHz } MF \text{ analog} \\ -118.db_m \; BW = 25 \text{ kHz } MF \; d \\ -38 \; db_m \; BW = 250 \text{ MHz} \end{bmatrix} \quad (4.0\text{-}2)$$

where C=speed of light 3×108 meters/second and
BW=spectral bandwidth in Hz.
Unambiguous range is mathematically given by $$R_{max} = \frac{C}{2 \Delta f \sqrt{\varepsilon_r}} \text{ in meters,} \quad (4.0\text{-}3)$$

where Δf=step in frequency step in Hz and
∈r=relative dielectric constant.
The SFCW radar can detect multiple objects as defined by the range resolution (ΔR).

The SFCW radar has an inherently high (-168-dB) detection sensitivity, but can be compromised by transmitter-to-receiver antenna cross-coupling.

The magnitude of a scattered or reflected signal (ER2) from an object or second interface must be larger than the near-zone signals arriving from the first interface (ER1). Any change in flying elevation of the radar antenna and ground electrical conductivity (σ) along the pathway over the ground surface creates non-deterministic near zone arriving signals.

Such non-deterministic clutter and lateral wave signal reflections cannot be averaged to zero, and appear as additive noise in the arriving near zone signal. However, installing absorption boundaries, like ferrite tiles, to cap the antenna ends can help minimize lateral reflection noise. The dynamic detection range of a receiver's A/D converter is predominated by the vector sum of the crosstalk and first interface reflection signals. What remains is only a small part of the conversion range to digitize the coherent far zone second interface reflection signal and the non-deterministic near zone clutter and lateral signals.

Phase jitter ($\dot{\theta}$) that depends on the signal to noise (S/N) ratio given as $$\dot{\theta} = \frac{1}{S/N}.$$

Traveling EM wave field components attenuate and reflect, decreasing the magnitude of the observable electric ($E_{R1}$ and $E_{R2}$) and magnetic ($H_{R1}$ and $H_{R2}$) and field components by several orders of magnitude below the illuminating fields ($E_i$ and $H_i$). There are lateral surface waves ($E_L$) that propagate along the free space-media interface. Lateral waves that intersect nearby surface obstacles are reflected and add to clutter signals arriving back to the radar. Any clutter added to the $E_{R2}$ response can increase the false alarm rate.

Idealized layered earth models do not include temporal, spatial and differential compaction effects occurring in the near surface. Geologic clutter effect EM wave propagation and false alarm rate. Propagation factors depend on the dimension less quantity σ/ω∈ (the loss tangent). That can change by several orders of magnitude. This is problematic for change detection and imaging algorithms.

False alarm rates will improve when surface clutter suppression is applied. If the loss tangent is greater or less than unity, the wave constants simplify and separate, as soils deposited in flood planes are clay based. When dry, the electrical conductivity is near 5-ms/m, but when wet can increase to 0.1 s/m. The relative dielectric can increase from four to thirty-four. For loss tangents much greater than one, the conductivity (σ). The magnetic permeability (μ) increases in volcanic soil.

$$\alpha = \begin{cases} \sqrt{\frac{\omega\mu\sigma}{2}}; \frac{\sigma}{\omega\varepsilon} \gg 1 \\ \frac{\sigma}{2}\sqrt{\frac{\mu}{\varepsilon}}; \frac{\sigma}{\omega\varepsilon} \gg 1 \end{cases} \text{ Nepers per meter (multiply by 8.686} \rightarrow \text{dB)}$$

and $$\beta = \frac{2\pi}{\lambda} = \begin{cases} \sqrt{\frac{\omega\mu\sigma}{2}}; \frac{\sigma}{\omega\varepsilon} \ll 1 \\ \omega\sqrt{\mu\varepsilon}; \frac{\sigma}{\omega\varepsilon} \gg 1 \end{cases} \text{ radians per meter}$$

The velocity of the traveling wave in the media is given by $$\upsilon = \frac{\omega}{\beta}\begin{cases} \sqrt{\frac{2\omega}{\mu\sigma}}; \frac{\sigma}{\omega\varepsilon} \gg 1 \\ \frac{c}{\sqrt{\varepsilon_r}}; \frac{\sigma}{\omega\varepsilon} \ll 1 \end{cases} \text{ meters/second}$$

The media impedance is given by $$|Z| = \begin{cases} \sqrt{\frac{i\omega\mu}{\sigma}} = \sqrt{\frac{\omega\mu}{\sigma}} \angle 45°; \frac{\sigma}{\omega\varepsilon} \gg 1 \\ \frac{377}{\sqrt{\varepsilon_r}}; \frac{\sigma}{\omega\varepsilon} \ll 1 \end{cases} \text{ Ohms.} \tag{4.0-8}$$

The digital circuitry is implemented around a microprocessor and synchronized with a highly stable, low-phase-jitter crystal controlled oscillator (XTAL). Four direct digital synthesizers are used to generate transmitter carrier and heterodyne frequencies for the lower and upper sideband signals. The heterodyne signals appear at the same intermediate frequency and are amplified before being applied to a synchronous analog-to-digital converter (A/D) and a field-programmable gate array (FPGA).

FIG. 13 represents the DSBg detection achieved by transmission of a double sideband suppress carrier waveform. The short wavelength DSBg radar lower and upper sidebands travel downward through the interface, each at different radian frequencies (e.g., ω=2πf). Signals applied to the receiver, mixer are phase coherent with the heterodyne signals. A gradiometric functionality is realized by down converting each of the returning lower and upper sideband signals to the same intermediate frequency, as illustrated in FIG. 14. The modulation frequency ($\omega_m$) is given by $$\omega_m = \frac{\omega_2 - \omega_2}{2}.$$

The lower sideband frequency components are represented by the vector sum of phasors, each with nearly identical phase shift (e.g., $\omega_1\tau_N$). A group of upper sideband frequency components is represented by the vector sum of phasors each with nearly identical phase shifts ($\omega_2\tau_N$). The group of lower sideband signals is subtracted from the upper sideband signals by the heterodyne down conversion mixer process.

A subtraction results because heterodyning causes the lower and upper group of signals to be 180° out of phase with each other. The lower and upper sideband signals reflected from the far zone interface are each shifted in phase by the radian frequency of each component multiplied by the round-trip travel times (e.g., $\omega_1\tau_F$ and $\omega_2\tau_F$).

FIG. 15 is a phasor representation of the gradiometric heterodyne process and quadrature detection of the far zone reflected I and Q Signals. (See, U.S. Pat. No. 6,522,285. Downward traveling lower and upper sidebands electromagnetic (EM) electric and magnetic field components can be projected as coherent sinusoidal wave forms. The arguments of each sinusoidal waveform have three phase terms: media phase constant X travel distance, varying either the radian frequency and software set, predistorted phase shift. Each coherent sinusoidal waveforms can be represented as stationary phasors.

Microcomputer software is used to set the phase shift of each of the coherent heterodyne signals, the mix down lower sideband phasor is shifted in phase to be exactly out of phase with respect to the upper sideband phasor enabling gradiometric nulling for suppression of the first interface reflection, geologic clutter and crosstalk. Gradiometric nulling achieving up to 70-dB of suppression.

The signal reflections arriving from the second interface can also be represented as a phasor and add to the vector sum of the lower and upper sideband phasors but with a phase differences (e.g., $\omega_m \tau_F$) that is varied by the microprocessor as represented by the dashed circles at the end of each summation of phasors in FIG. 14.

A gradiometric subtraction of the second interface phasors is processed by the microprocessor, e.g., by varying the phase of the upper and lower heterodyne frequency components with an optimization algorithm that nulls the magnitudes of the group of intermediate frequency signals. Experiments have shown that near zone crosstalk, first interface, and clutter signals are suppressed by at least 60-dB, an improvement of 30-dB over non-double side band processing methods.

The intermediate frequency signals are forwarded to a quadrature detector (FIG. 1) where the in-phase (I) and quadrature (Q) components of the intermediate frequency signal are recovered and algorithmically processed to display detection and range to an object. The quadrature detector in-phase (I) and quadrature (Q) signals are mathematically represented by $$I = \cos(\omega_m \tau + \theta_m)\cos(\omega_{cm}\tau + \theta_m) \qquad \text{In-phase (I)}$$

and $$Q = \cos(\omega_m \tau + \theta_m)\sin(\omega_{cm}\tau + \theta_{cm}) \qquad \text{Quadrature (Q)}$$

where, $\omega_{cm} = 2\pi f_{cm}$ is the radian frequency of the suppressed carrier signal and $f_{cm}$ is in Hertz.

The magnitude of quadrature detection signal is, $$M = |I^2 + Q^2|^{1/2} = |\cos(\theta_m + \omega_m \tau)|$$

$$\omega_{cm}\tau + \theta_{cm} = \tan^{-1}\frac{Q}{I}.$$

The microprocessor controls the sideband separation frequency ($\omega$m) to determine the range (distance) to the reflecting object. Since the roundtrip travel time to the second reflecting interface is invariant, the change in modulation frequency ($\Delta\omega$) required for the I, Q signals to vary from maximum to minimum determines the range given by $$R = \frac{1}{2}v\tau_F = \frac{\pi v}{4\Delta\omega_m},$$

where, the velocity, v, in the natural media depends upon the loss tangent and is, for example, approximately $1.5 \times 10^8$ meters/second through coal.

Each heterodyne double side band signal coherent phase difference is shifted in phase ($\theta_m$) to $\pi/2$ radians, which changes the magnitude coefficients of the I, Q signals from $\cos(\omega_m\tau)$ to the $\sin(\omega_m\tau)$. As the Bausov suppression chart of FIG. 15 illustrates, near zone (e.g., small $\tau$) signals are suppressed by the $\sin(\omega_m\tau)$.

In an experiment, DSBg in-phase (I) and quadrature (Q) signals were acquired during a pass over a 2×2×4-foot empty wooden crate buried eight feet deep in clay soil with an electrical conductivity of 20 mS/m at 150-MHz and an attenuation rate of 2.5-dB/foot for frequencies above 100-MHz. The reflected second interface signal received was 46-dB below the magnitude of the first reflection signal.

The derivative of the magnitude response exhibited the typical M-shape of a gradiometric response. The modulation frequency ($\omega_m$) was varied by changing the sideband separation radian frequency over 15.43-MHz and observing the magnitude changes from minimum to maximum. The data closely agreed with the burial depth of eight feet.

In FIG. 15 Bausov Suppression Factor, the circles represent the near zone suppression dependence on modulation frequency ($\omega$m).

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

What is claimed is:

1. A multi-modal ground penetrating radar (MMGPR), comprising:
    a radar set configured to launch predistorted double-sideband (DSB) suppressed-carrier modulated continuous waves (CW) to illuminate and penetrate a ground surface;
    a variable frequency modulator connected to modulate a continuous wave (CW) carrier frequency generator within the radar set to yield a double-sideband suppressed carrier output;
    a lateral single-file array of antennas configured to be flown closely over the surface of the ground; and
    a multiplexing switch connected to the array of antennas and configured to selectively switch individual ones of said antennas to the radar set;
    wherein, early arriving signals returned from geologic clutter and surface reflections are suppressed in synchronous detection in relation to signals received by the array of antennas from less shallow depths; and
    wherein, objects below the ground surface are detected and located by said late arriving signal reflections.

2. The MMGPR of claim 1, wherein:
    each said antenna is a type of resonant microwave patch antenna (RMPA) and is configured to be kept in resonance during operation of the radar set while measuring its input impedance as a measure of the dielectric or conductive nature of objects just below the ground surface.

3. The MMGPR of claim 1, wherein:
    said predistorted double-sideband (DSB) suppressed-carrier modulated continuous waves (CW) are predistorted in their relative phases between upper and lower sidebands.

4. The MMGPR of claim 1, wherein:
    the radar set is carried by, and the lateral single-file array of antennas are cantilevered out on a boom in front of a truck.

5. The MMGPR of claim 1, further comprising:
    a modulation-frequency frequency-control available to a user for suppressing early arriving surface reflection signals.

6. The MMGPR of claim 1, further comprising:
    a first log of data representing radar set measurements and their corresponding geographic positions taken on a first pass along a path over the surface of the ground.

7. The MMGPR of claim 6, further comprising:
a second log of data representing radar set measurements and their corresponding geographic positions taken on a second pass along said path over the surface of the ground.

8. The MMGPR of claim 7, further comprising:
an output representing any changes and differences in objects identified and located during said first and second passes.

9. The MMGPR of claim 1, further comprising:
a phase coherent quadrature detector is connected to receive intermediate frequencies heterodyned down from upper and lower sidebands in late arriving signal reflections, and is configured to output digital in-phase and quadrature phase samples for digital signal processing that can characterize objects buried below the ground surfaces returning said reflections.

10. A radar method for rejecting and looking past surface reflections, comprising:
transmitting a pair of radio frequency carriers with a separation frequency equivalent to a modulation frequency;
directing the transmission of said pair of radio frequency carriers into the earth from the surface above with a transmitting antenna;
synchronously detecting any reflections from below of said pair of radio frequency carriers which are received by a receiving antenna;
adjusting said modulation frequency to minimize early arrivals of signals reflected from the surface; and
adjusting said modulation frequency to maximize later arrivals of signals reflected from objects below the surface.

11. The method of claim 10, further comprising:
adapting resonant microwave patch antennas (RMPA's) to the job of transmitting said pair of radio frequency carriers.

12. The method of claim 10, further comprising:
adapting resonant microwave patch antennas (RMPA's) to the job of receiving early and later arriving reflections of said pair of radio frequency carriers from the surface.

\* \* \* \* \*